(12) United States Patent
Coffman et al.

(10) Patent No.: US 10,645,435 B1
(45) Date of Patent: May 5, 2020

(54) AD MEDIA MANAGEMENT SYSTEM

(71) Applicant: INNOVAR MEDIA LLC, Irving, TX (US)

(72) Inventors: Webster Shawn Coffman, Norman, OK (US); Steve Laughlin, McKinney, TX (US)

(73) Assignee: INNOVAR MEDIA LLC, Irving, TX (US)

( * ) Notice: Subject to any disclaimer, the term of this patent is extended or adjusted under 35 U.S.C. 154(b) by 0 days.

(21) Appl. No.: 16/559,906

(22) Filed: Sep. 4, 2019

(51) Int. Cl.
| | |
|---|---|
| *H04N 21/2543* | (2011.01) |
| *H04H 60/06* | (2008.01) |
| *H04N 21/258* | (2011.01) |
| *H04N 21/454* | (2011.01) |
| *H04N 21/81* | (2011.01) |
| *H04H 60/37* | (2008.01) |
| *H04N 21/25* | (2011.01) |
| *H04N 21/24* | (2011.01) |

(52) U.S. Cl.
CPC ...... *H04N 21/25435* (2013.01); *H04H 60/06* (2013.01); *H04H 60/375* (2013.01); *H04N 21/25891* (2013.01); *H04N 21/454* (2013.01); *H04N 21/812* (2013.01); *H04N 21/24* (2013.01); *H04N 21/2407* (2013.01); *H04N 21/25* (2013.01); *H04N 21/251* (2013.01); *H04N 21/258* (2013.01); *H04N 21/2585* (2013.01)

(58) Field of Classification Search
None
See application file for complete search history.

*Primary Examiner* — Justin E Shepard

(57) ABSTRACT

A system for managing advertising media by a cable network provider includes a content provider interface for downloading advertising media from advertising media content providers. A database stores the advertising media. A processor configures an advertising media management system responsive to a stored set of instructions. A memory coupled to the processor has data and a set of instructions for implementing an advertising media management system. The data includes the advertising inventory data and the set of instructions configuring the processor to provide a number of controllers. A management dashboard controller controls a presentation of a plurality of graphical reports relating to available advertising media within the database using a management dashboard controller. A required media controller generates a list of received advertising media that have not been encoded. A queue controller groups the advertising media stored within the database to be processed by the advertising media management system according to a first queue of all advertising media to be processed and a plurality of second queues each comprising a portion of all of the advertising media of the first queue, wherein at least one advertising media is contained within multiple ones of the plurality of second queues. A media library controller displays all approved advertising media stored within the database and an associated status of the approved advertising media. An audit logs controller tracks all user interaction with each of the advertising media stored within the database through the advertising media management system and tracks all functional tasks preformed on each of the advertising media stored within the database. An application administration controller controls of system application settings.

24 Claims, 25 Drawing Sheets

FIG. 12

GLOBAL OVERVIEW

| 1220 — Master | 1222 — Operation Centers | 1224 — Media Techs |
|---|---|---|
| 1226 — Total 7 | | |
| 1228 — Pending Approval 3 | 1230 — Approved 3 | 1232 — Rejected 1 |

Master Content QA

10 records — 1204

Advanced Search — 1218  1219  Search: _____ Refresh

| Media ID | Status | Media Name | Operation Center | Media Tech | Date Uploaded | Action Date | Tags | Action |
|---|---|---|---|---|---|---|---|---|
| QA-A00001 | Rejected | company 1 | Operation Center 3 | Ruben Smith | 2017-11-22 08:20:00 | 2017-11-22 08:44:00 | 1226 | |
| QA-A00004 | Pending Approval | company 2 | Operation Center 3 | Ruben Smith | 2017-11-22 08:23:00 | | | |
| QA-A00005 | Pending Approval | company 3 | Operation Center 3 | Ruben Smith | 2017-11-22 08:24:00 | | | |
| QA-A00006 | Pending Approval | company 4 | Operation Center 3 | Ruben Smith | 2017-11-22 08:24:00 | | | |
| SRA00014 | Approved | company 5 | Operation Center 3 | Ruben Smith | 2017-11-22 08:20:00 | 2017-11-22 08:29:00 | | |
| SRA00015 | Approved | company 6 | Operation Center 3 | Ruben Smith | 2017-11-22 08:21:00 | 2017-11-22 14:30:00 | | |
| SRA00016 | Approved | company 7 | Operation Center 3 | Ruben Smith | 2017-11-22 08:21:00 | 2017-11-22 14:30:00 | | |

1206  1208  1210  1212  1214  1216

Showing 1 to 7 of 7 entries

1202

| Media Library | | | | | | | | Q Advanced Search | ⟳ Refresh |
| --- | --- | --- | --- | --- | --- | --- | --- | --- | --- |
| 1306 | 1308 | 1310 | 1312 | 1314 | 1316 | | | Displaying 251 of 275 of 11126 entries ~1320 ~1322 | ~1324 |
| | | | | | | | 1318 | | |
| Media ID | Title | Status | Client ID | Client Name | ISCI | Media Type | Length | Uploaded ▼ | Action |
| QA-800215 | SALE-04A | Rejected | | | TIB0401VNISN | Video | 30 | 2018-01-16 15:15:14 | |
| QA-800173 | Product 1 | Rejected | | | FCT17130N | Video | 30 | 2018-01-16 15:13:42 | |
| QA-800167 | QCVC2653N UFC220 | Rejected | | | QCVC2653N | Video | 30 | 2018-01-16 15:13:29 | |
| QA-800157 | SALE 02A | Rejected | | | T1B0202VNISN | Video | 30 | 2018-01-16 15:13:06 | |
| QA-800153 | Company 8 Promo Updated | Rejected | | | MCCUMFLIBUN | Video | 30 | 2018-01-16 15:12:58 | |
| QA-800128 | Vault | Rejected | | | XLND8302 | Video | 30 | 2018-02-23 10:05:29 | |
| QA-800123 | Why Choose Company 9 | Rejected | | | XLN50364 | Video | 30 | 2018-02-22 17:35:49 | |
| QA-800093 | Big HomeScore Event Wk 1,2,3 Col 15 | Rejected | | | LMS-AA-011518-10 | Video | 15 | 2018-01-16 15:21:18 | |
| QA-800030 | Ultimate Home Sale Wk 1,2,3 Col 15 | Rejected | | | LMS-MM-011518-10 | Video | 15 | 2018-01-16 15:21:11 | |

Media Associations

| | First Run ▲ | Spot ID | ISCI | Spot Name | ISCI | Length | Client ID | Client Name | Group | AE |
|---|---|---|---|---|---|---|---|---|---|---|
| ▲ | 11/30/2017 | SRA00050 | | company1 | | | 27653 | Client A | R031 | AE -621 |
| ▲ | 12/15/2017 | SRA00051 | | jasontest2 | | 30 | 27653 | Client A | R031 | AE -621 |
| ▶ | 12/15/2017 | SRA00052 | | jasontest3 | | 30 | 27653 | Client A | R031 | AE -621 |

Spot Association
winterfest
Spot ID
SRA00013

| Match | Media Name | ISCI | Media Length | Media Received | Media ID |
|---|---|---|---|---|---|
| ⊙ 50% | winterfest | FR651 | 30 | 2017/04/25 04:21:00 | SRA00013 |

Associate Media

1602
Company13 projects
0:00/00:30

File Information
File Name: winterfest.mp4
File Type: MPEG-4
Delivery: InnTouch
File Size: 1.43 MB
Duration: 00:00:30
Width: 1280
Height: 720
Frames: 750
Frame Rate: 25
Aspect Ratio: 16:9

| ▲ | 12/15/2017 | SRA00029 | justin | | | | | | | AE -621 |

Showing 11 to 20 of 20 entries

< 1 2 >

1604 Today 20
1606 Tomorrow 0
1608 2-3 Days 0
1610 4+ Days 0
1614 Non-Encode
Search
1612 10 records

TO FIG. 16B

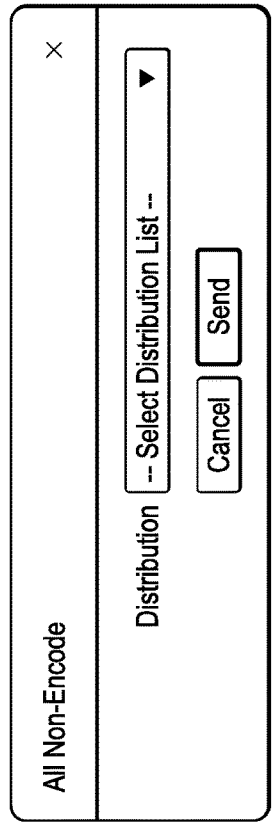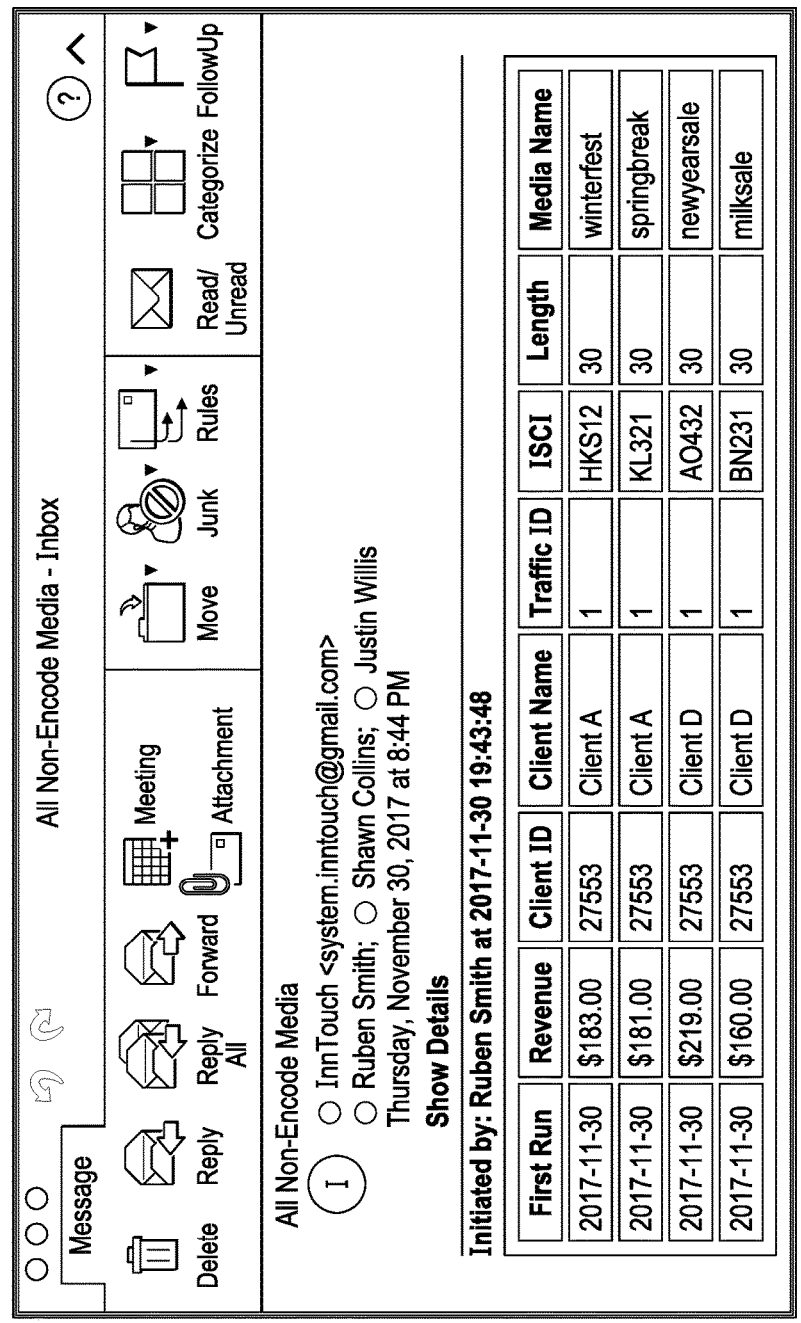
FIG. 16B

FIG. 20

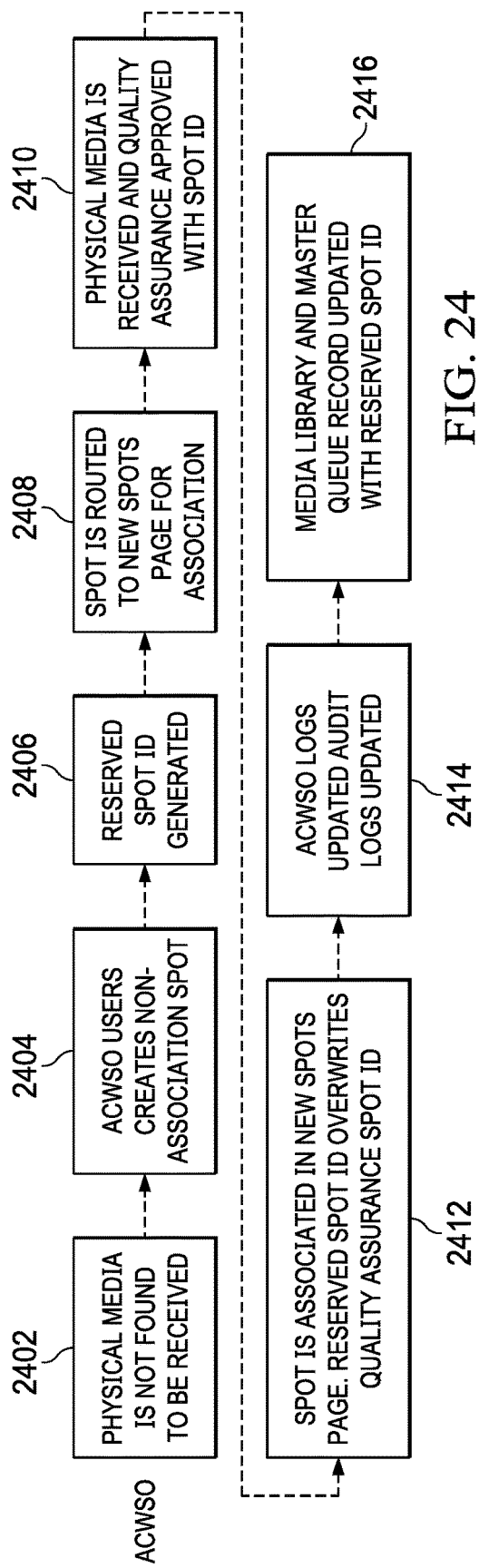
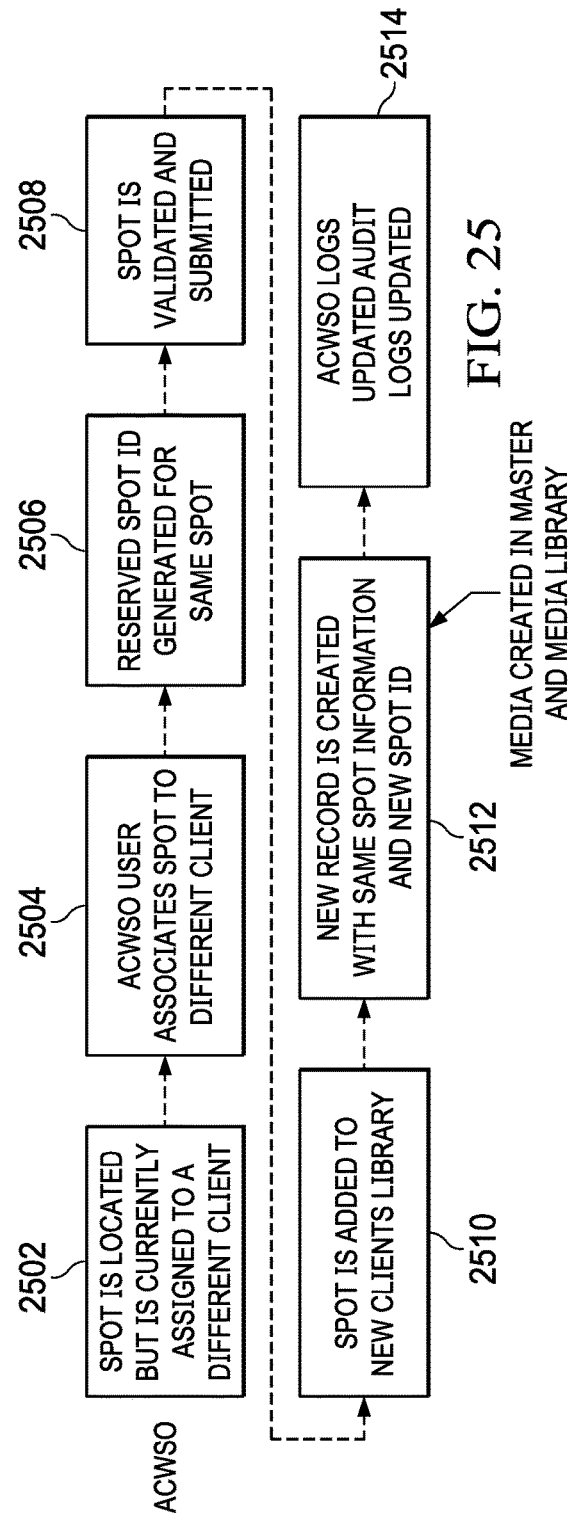
FIG. 24
FIG. 25

AD MEDIA MANAGEMENT SYSTEM

TECHNICAL FIELD

The present system relates to managing advertising media content, and more particularly, to a system for managing advertising media for cable network providers or online.

BACKGROUND

Cable television network operators receive programming inputs from a variety of network providers such as major television networks, ESPN, A&E, TNT, FX and a variety of other cable networks. Each of these networks are broadcast to customer areas within the cable operators operating area. These areas may have various differences in the networks and channels broadcast to each based upon the location within the cable operators operating area. Each of the networks provide cable operators with a number of advertising slots within the programs or time periods based on their agreement. The cable operators sell these advertising slots at a local or national level to generate advertising revenue. The advertising media that are broadcast within these sold advertising slots must be managed by the cable providers in order to accurately present the purchased advertising slots with the appropriate advertising media that a purchaser desires to be broadcast within their purchased advertising slots. Thus, a system for managing advertising media that has been generated for broadcast within advertising slots of various cable network systems would be of great benefit cable service or other types of online network providers.

SUMMARY

The present invention, as disclosed and described herein, in one aspect thereof comprises a system for managing advertising media by a cable network provider includes a content provider interface for downloading advertising media from advertising media content providers. A database stores the advertising media. A processor configures an advertising media management system responsive to a stored set of instructions. A memory coupled to the processor has data and a set of instructions for implementing an advertising media management system. The data includes the advertising inventory data and the set of instructions configuring the processor to provide a number of controllers. A management dashboard controller controls a presentation of a plurality of graphical reports relating to available advertising media within the database using a management dashboard controller. A required media controller generates a list of received advertising media that have not been encoded. A queue controller groups the advertising media stored within the database to be processed by the advertising media management system according to a first queue of all advertising media to be processed and a plurality of second queues each comprising a portion of all of the advertising media of the first queue, wherein at least one advertising media is contained within multiple ones of the plurality of second queues. A media library controller displays all approved advertising media stored within the database and an associated status of the approved advertising media. An audit logs controller tracks all users interaction with each of the advertising media stored within the database through the advertising media management system and tracks all functional tasks preformed on each of the advertising media stored within the database. An application administration controller controls of system application settings.

BRIEF DESCRIPTION OF THE DRAWINGS

For a more complete understanding, reference is now made to the following description taken in conjunction with the accompanying Drawings in which:

FIG. 12 illustrates a master queue global view;

FIG. 13 illustrates information associated with an uploaded advertising media content file;

FIGS. 16A and 16B illustrate required media functionalities;

FIG. 20 illustrates library look up functionalities;

FIG. 24 illustrates the generation of spot IDs by the ad copy wizard for non-associated advertising media content;

FIG. 25 illustrates the ad copy wizard-generated spot ID for a reprocessed advertising media content that is associated with a new client;

DETAILED DESCRIPTION

Figure 1:
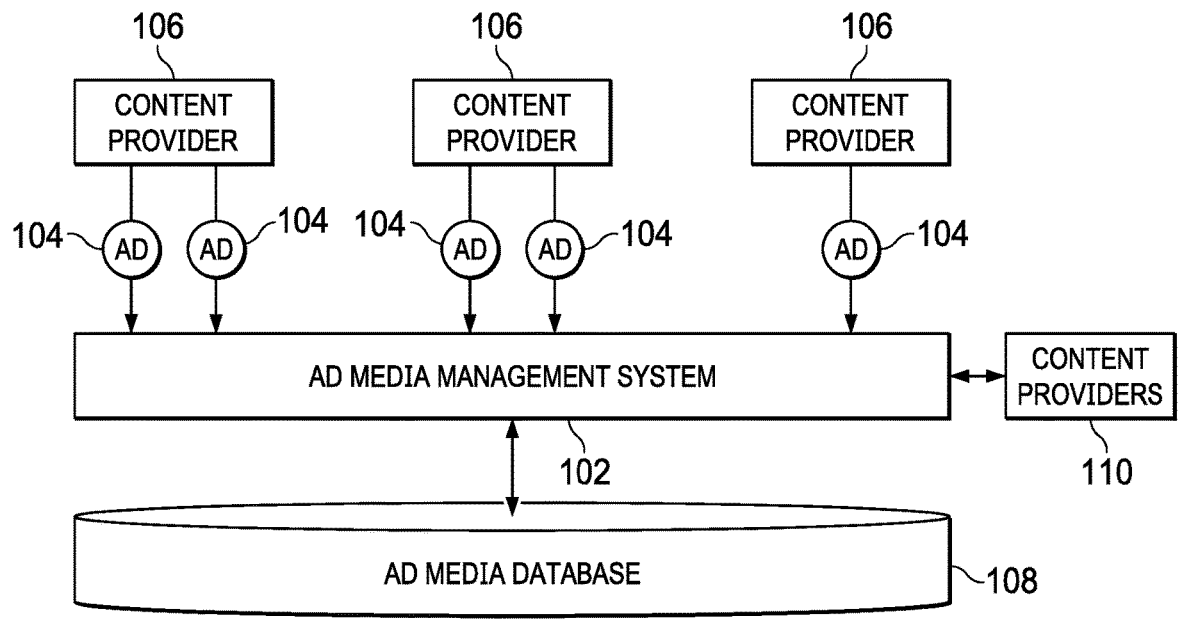
FIG. 1 illustrates an operating environment of an advertising media management system.

Referring now to the drawings, wherein like reference numbers are used herein to designate like elements throughout, the various views and embodiments of an advertising media management system are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated an operating environment of an advertising media management system 102. The advertising media management system 102 receives advertising media 104 from multiple content providers 106. Each content provider 106 may produce one or more advertising media 104 that can be uploaded to the advertising media management system 102. The advertising media management system 102 manages and identifies the relevant advertising media information 104 for storage within an advertising database 108. The advertising media database 108 contains all of the advertising media that are used for broadcast within sold advertising slots by the cable network or online network media providers. The advertising media are broadcast to various content providers 110 within the advertising slots of the content providers that have purchased.

Figure 2:
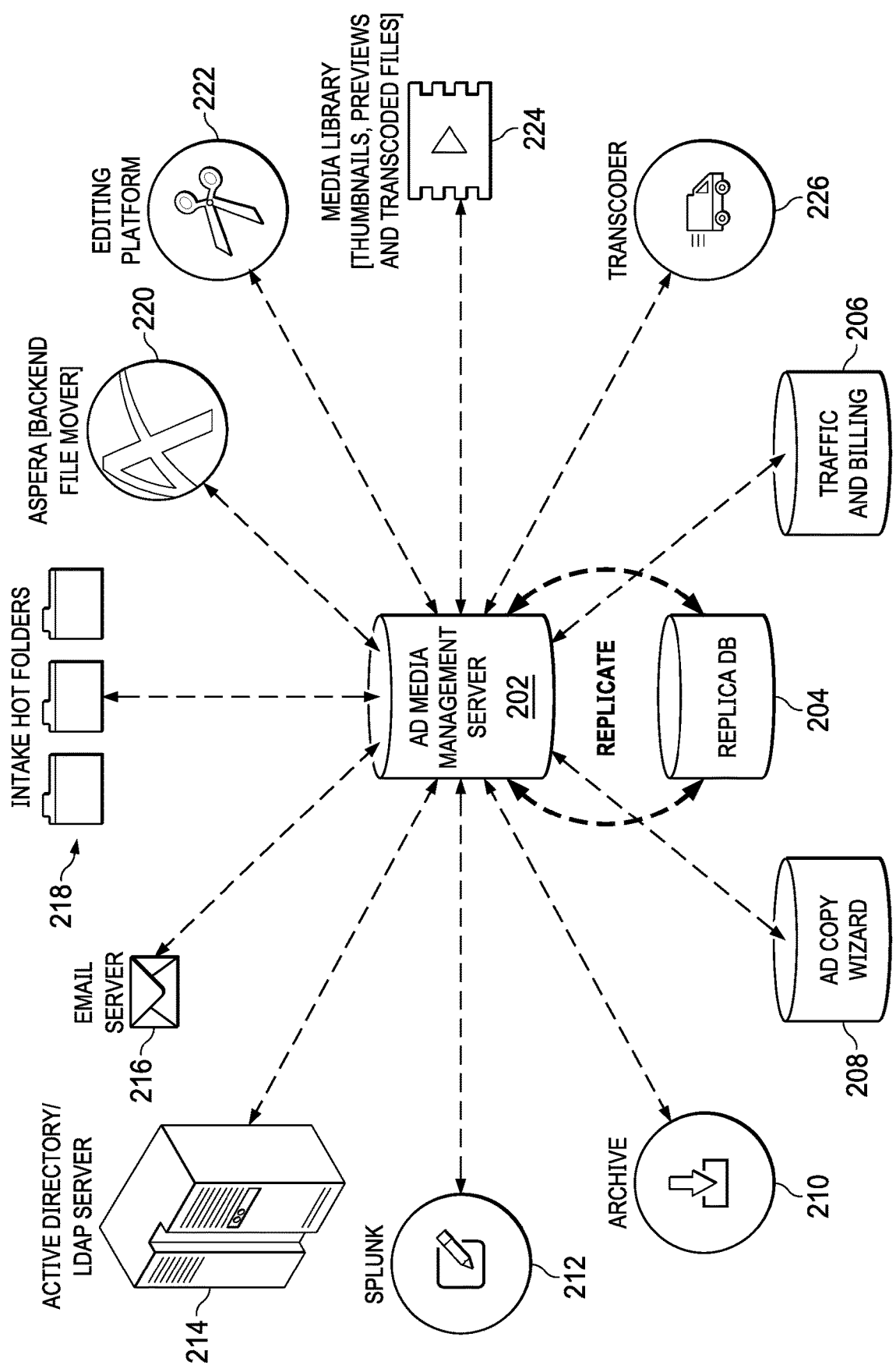
FIG. 2 illustrates various typical connection points of the advertising media management system.

Referring now also to FIG. 2, there is provided a further illustration of the various typical connection points of the advertising media management system 102. The advertising media management system server 202 would interact with a replica server 204 on which data stored within the advertising AP server 202 could be backed up and replicated. The advertising management server 202 also interacts with a variety of other components and items to enable control of the advertising media interactions. These include traffic and billing servers 206 and ACW servers 208 providing information on system traffic. The server 202 may also interact with various archives 210, reporting servers 212, active directory/LDAP server 214, email server 216, intake hot folders 218, backend file movers 220 (such as ASPERA), editing platforms 222 for editing the advertising media, various media libraries 224 providing thumbnails, previews and transcoding files and transcoders 226. Each of these connection points enable various operation upon associated advertising media to be modified/manipulated.

Figure 3:
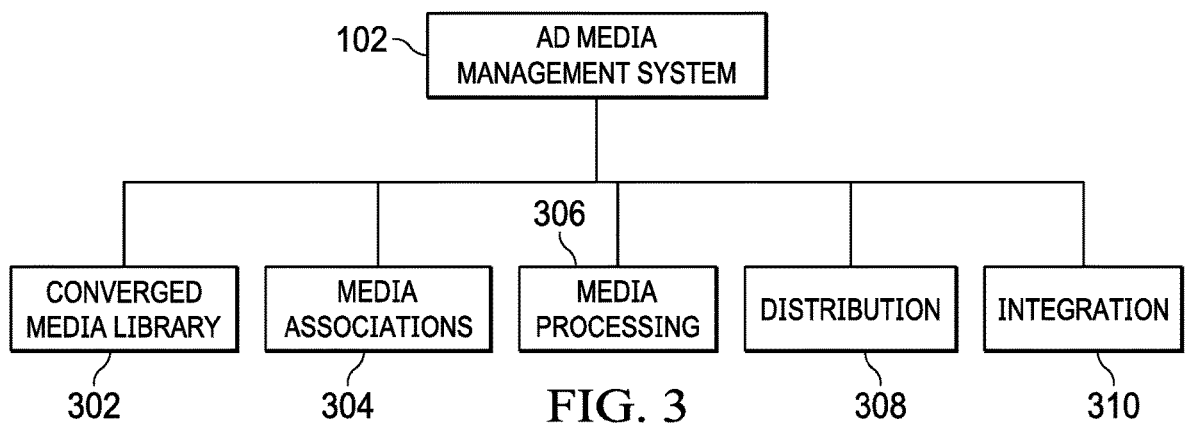
FIG. 3 illustrates an overview of various system operations of the advertising media management system.

Referring now to FIG. 3, there is illustrated an overview of various system operations of the advertising media management system 102. These include a converged media library 302, media associations 304, media processing 306, distribution processes 308 and integration of operational processes 310. The converged media library 302 enables all of the created advertising media content to be stored within a converged database for easy access by the cable or online network provider. The media associations 304 enable accurate indications of advertising media to be provided with respect to other advertising media and content providers and advertising media providers. Automated media processing 306 provides functionalities enabling for generated advertising media to be automatically processed and stored within the converged media libraries 302 for ease of access and processing by the advertising media management system 102. Distribution functionalities 308 enable for the effective distribution of the advertising media content to various content providers by the cable or online network providers. The appropriate ads are distributed to the appropriate networks in the appropriate time slots according to the advertising slots purchased by a particular customer. The advertising media management system 102 also provides for the integration of operational processes 310 of the system such that all activities associated with the processing, storage and presentation of advertising media may be handled from a single centralized location.

Figure 4:
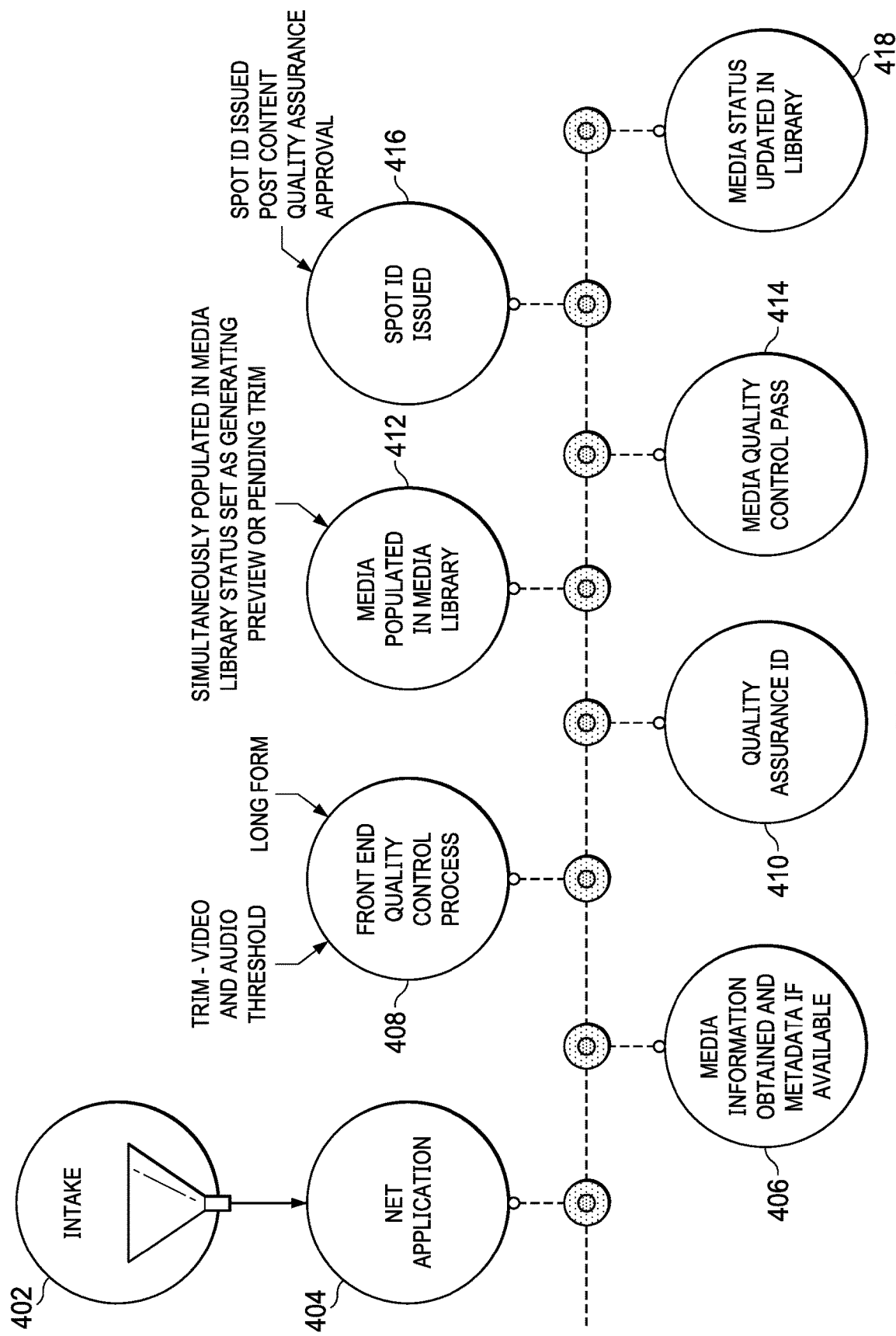
FIG. 4 illustrates a high level flow diagram of the intake of new advertising media and quality assurance of received advertising media content.

Referring now to FIG. 4, there is illustrated a high level flow diagram of the intake of new advertising media and quality assurance of received advertising media content. The initial intake process 402 may come from a variety of one spot add aggregators such as Extreme Reach, Sentara, Javelin, Comcast, Spot Traffic, EZSpot, Yangaroo, etc. Additional intake may come from file movers such as manual downloads. The advertising media are provided to the network application 404 comprising the advertising media management system 102. For each of the received applications, the advertising media information is obtained and determinations are made if any metadata is available at 406. This information is required for population of internal metadata fields. Next, the received advertising media may have front end quality control processing performed thereon. This processing may comprise things such as trimming the video and audio thresholds to meet broadcast requirements and filling out longform requirements with respect to identifying information in characteristics regarding the received advertising media. Next, a quality assurance identifier is issued by the advertising media management system 102 at 410. The quality assurance identifier is associated with the advertising media by the system as the advertising media is going through the quality assurance confirmation process by the system. The media is located within the media library at 412. This will involve simultaneously populating the advertising media within the media library and having its status set as generating a preview or pending completion of trim of the audio or video portions. Next, the advertising media must pass quality control analysis at 414. The quality control requirements make sure that the provided advertising media meets the broadcast requirements associated with the cable or online network providers in order to assure appropriate broadcast of the media. Once the advertising media has passed all of the quality control requirements, a spot identifier is issued to the advertising media at 416 by the advertising media management system 102. The spot ID is issued after the advertising content has been approved by the quality assurance process. The spot ID is associated with the advertising media throughout management process by the advertising media management system 102. The media status is updated within the media library at 418 responsive to completion of the quality assurance process at 414 and issuing of the spot ID at 416.

Figure 5:
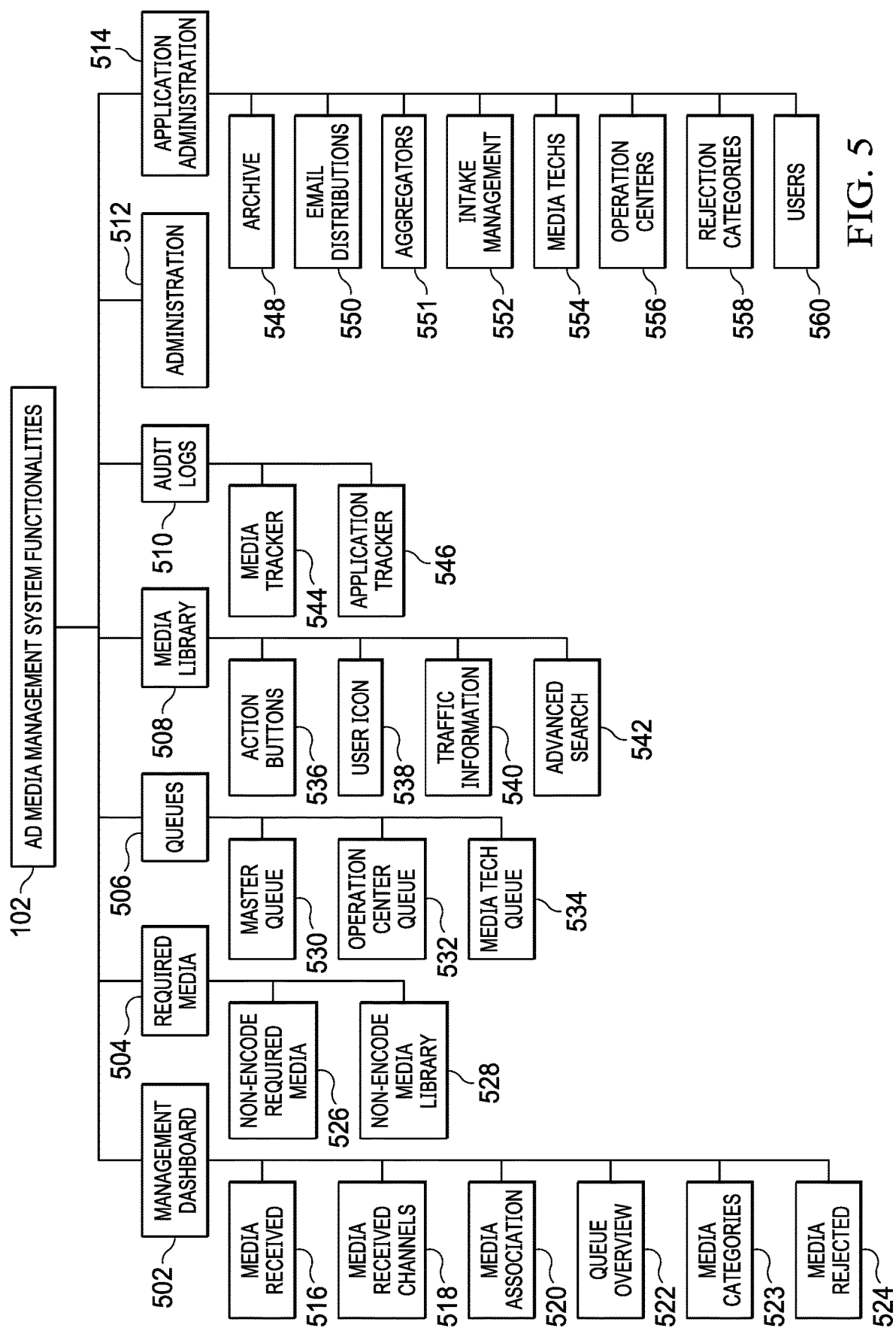
FIG. 5 illustrates top level functionalities of the advertising media management system.

Referring now to FIG. 5, there is illustrated the top level functionalities of advertising media management system 102. When navigating the advertising media management system 102 functionalities, a user will access the various pages and functionalities through use of a user interface which may in one example comprise a vertical menu bar that provides access to the various functionalities. The various functionalities include management dashboard functionalities 502, required media functionalities 504, queue functionalities 506, media library functionalities 508, audit loss functionalities 510, administration functionalities 512 and application administration functionalities 514. The management dashboard functionalities 502 provide various reporting and metric functionalities with respect to the provided advertising media. The management dashboard functionalities 502 provide graphical reports on received media 516, receive media channels 518, media to spot associations 520, cues overview 522, media categories 523 and rejected media 524.

Figure 6:
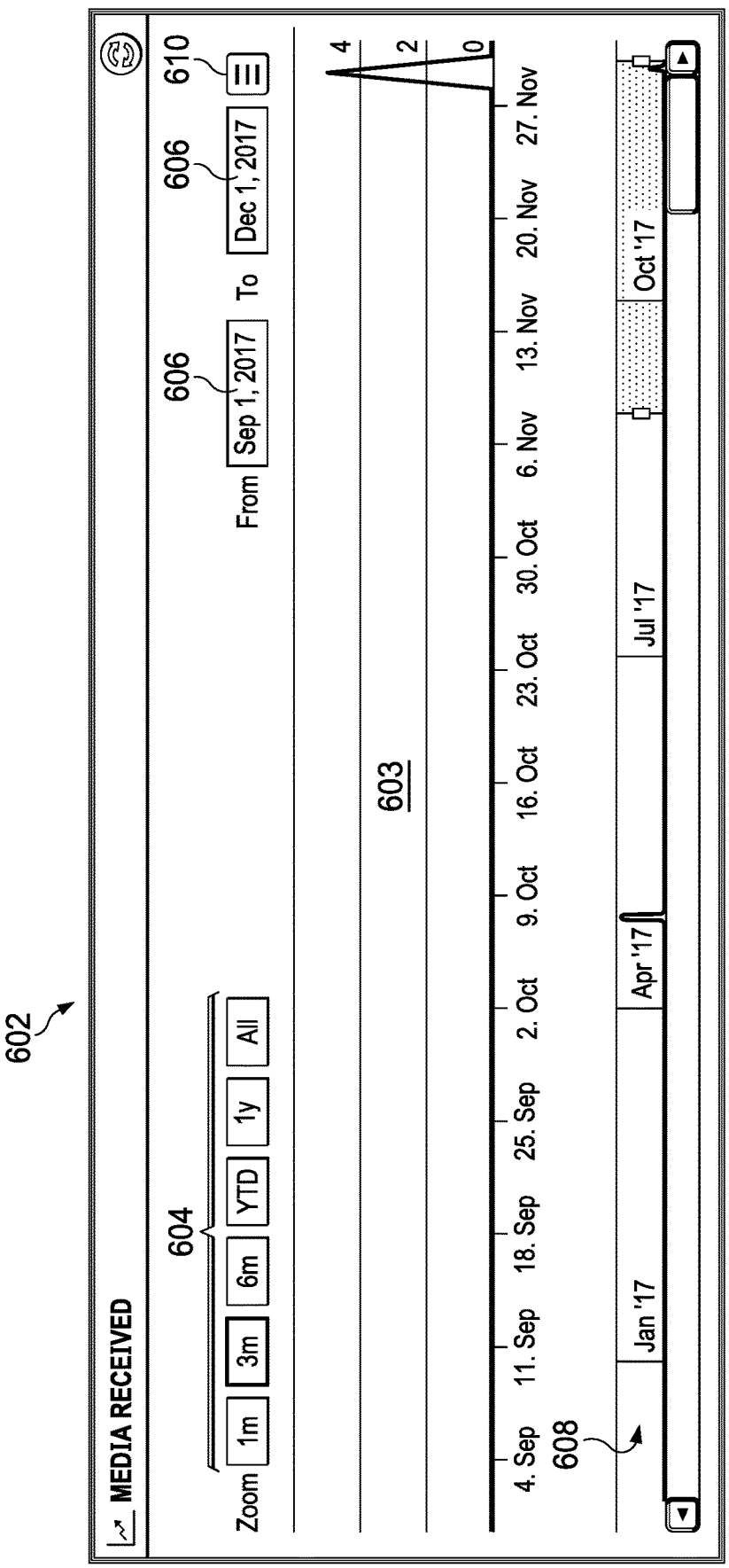
FIG. 6 illustrates a media received graphical report.

Referring now to FIG. 6, there is illustrated the media received graphical report 602. The media received graphical report 602 displays the received by date for a particular advertising media within a window 603. The information within the media received graphical report 602 may be filtered by one month, three months, six months, year to date, one year or all using interface buttons 604. Alternatively, the displayed media may be displayed in a selected date range using date range fields 606. The media received information within the media received graphical report 602 can be scrolled through to a specific date range within the scrollbar 608. Finally, the media received graphical report 602 may be exported as a PDF using interface button 610. The media received will not be populated until the media has been approved in the content quality assurance queue.

Figure 7:
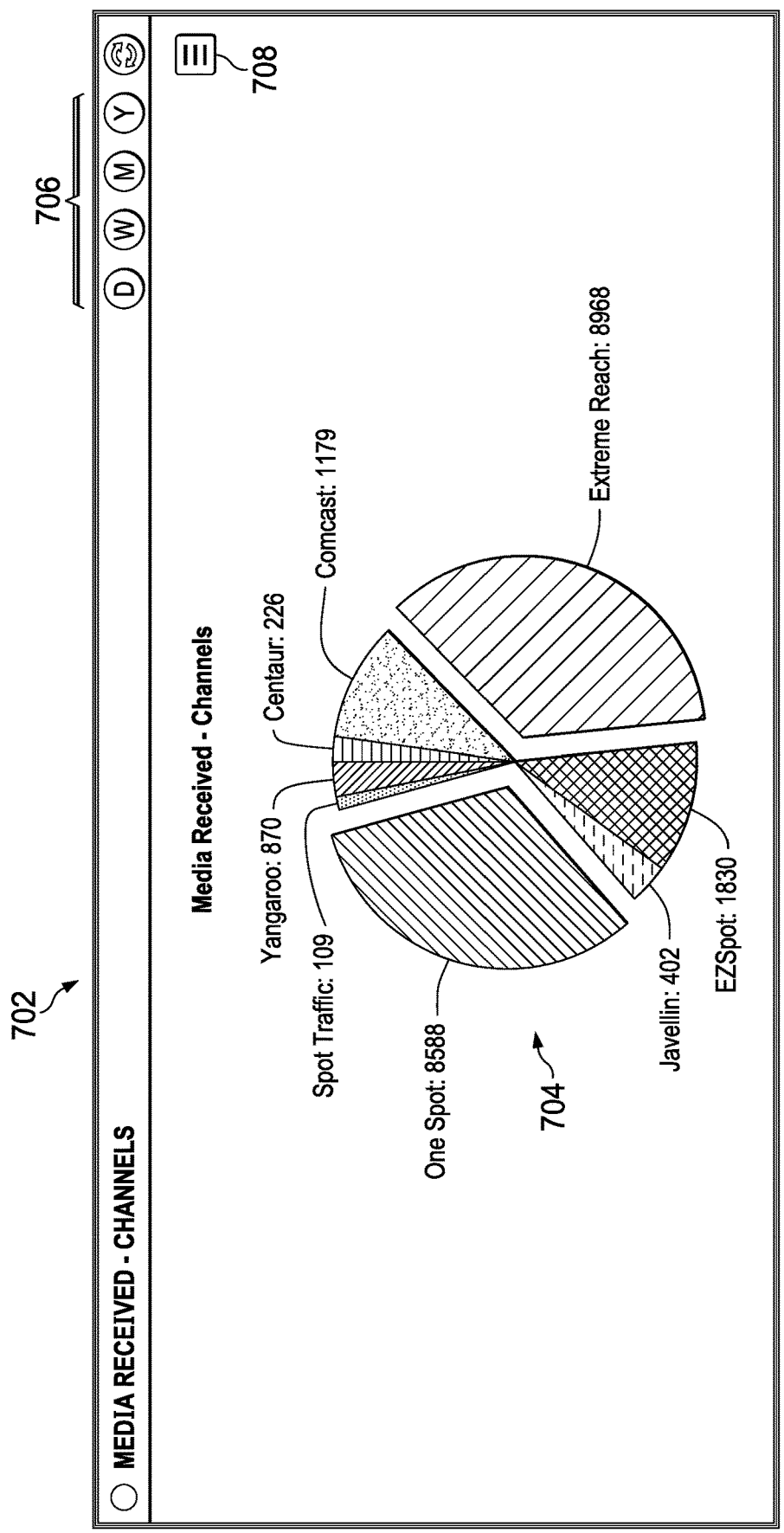
FIG. 7 illustrates a media receive channels graphical report.

Referring now to FIG. 7, the media receive channels graphical report 702 displays information with respect to the media received by channel in a pie chart format as illustrated generally at 704. Interface buttons 706 may be used to filter the media received by channel information, by day, week, month or year. The material displayed by the pie chart illustrates media received from Extreme Roach, EZSpot, Javelin, One Spot, Spot Traffic, Yangaroo, Centaur and Comcast. The media received by channel will not be populated until the media has been approved in the content quality assurance queue. The graphical report 702 can then be exported as a PDF using interface button 708.

Figure 8:
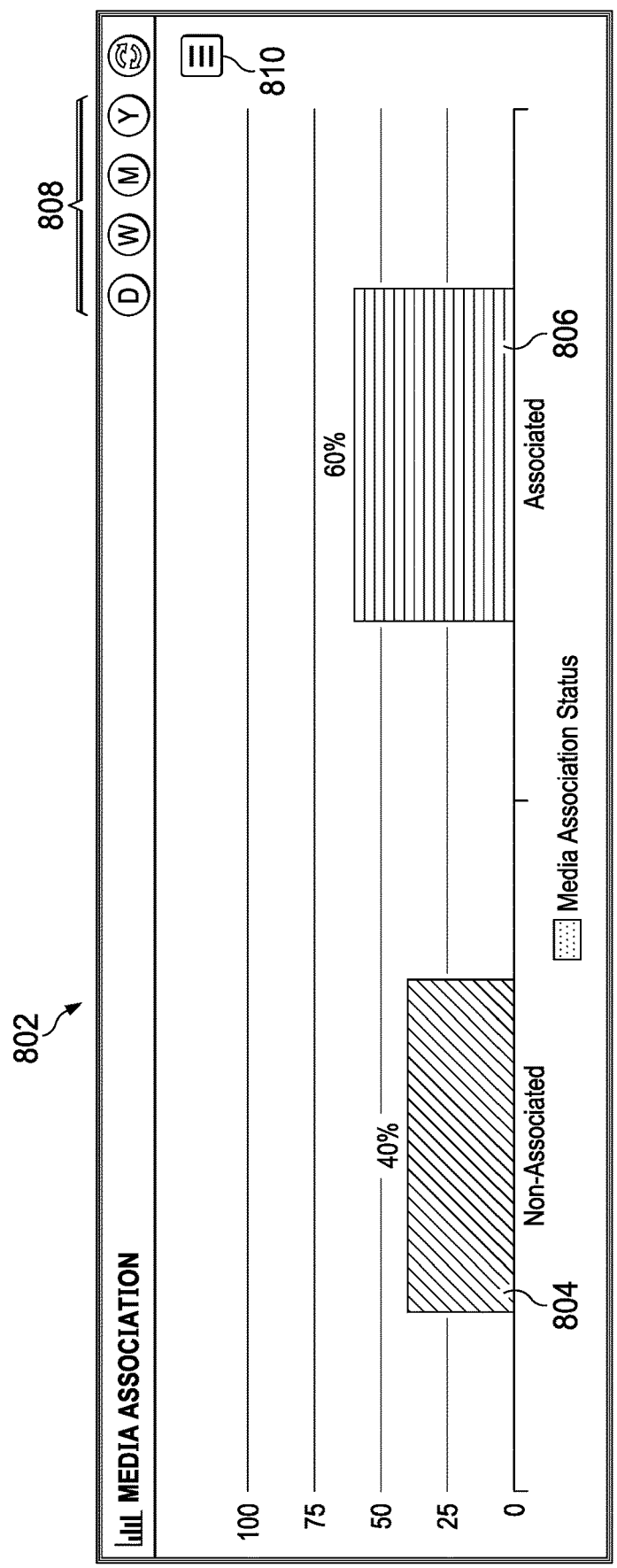
FIG. 8 illustrates a media association graphical report.

Referring now to FIG. 8, there is illustrated the media association graphical interface 802 that displays a percentage of non-associated media 804 and a percentage of associated media 806 in a columnar format. The display may be filtered by day, week, month or year using control buttons 808. As described previously, the graphical report can be exported in PDF format using control button 810.

Figure 9:
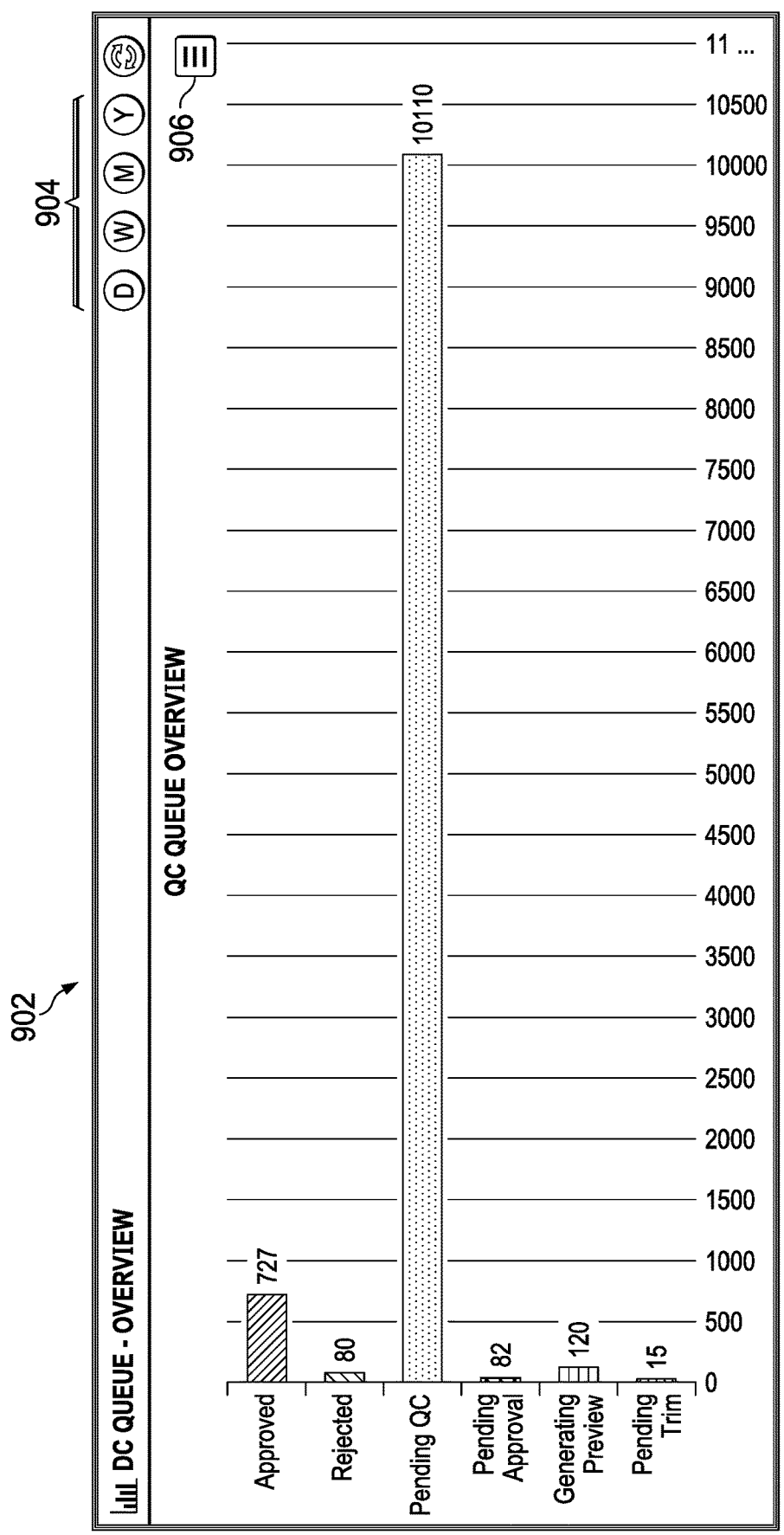
FIG. 9 illustrates a queue interface overview graphical report.

FIG. 9 illustrates the queue interface overview graphical report 902. The queue overview report 902 displays the various advertising media content by category. These include an approved queue, rejected queue, pending QC queue, pending approval queue, generating preview queue and pending trim queue. The categories of queue may be further filtered by day, week, month, year using control buttons 904. These reports may then be exported as a PDF through control buttons 906.

Figure 10:
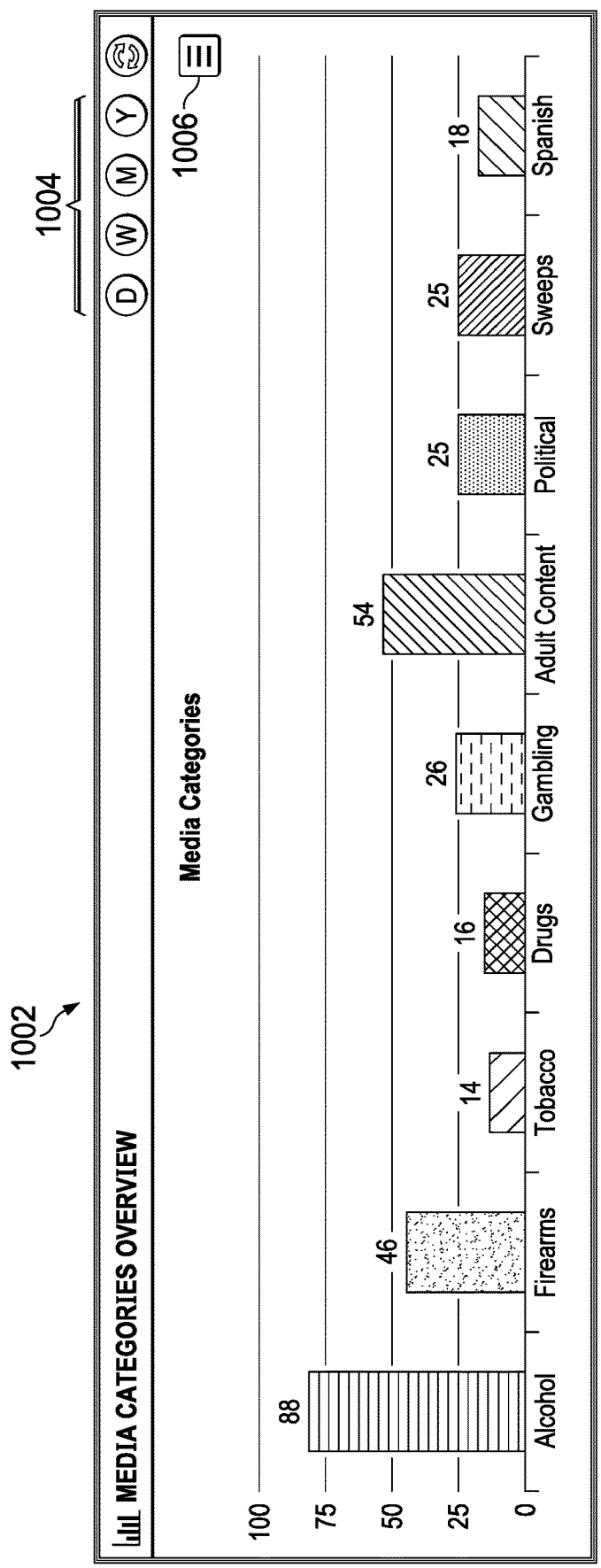
FIG. 10 illustrates a media categories overview.

The media categories overview is provided via graphical report 1002 as shown in FIG. 10. The media categories overview displays media content with respect to the advertising media by category. These media categories include, but are not limited to alcohol, firearms, tobacco, drugs, gambling, adult content, political, sweeps, Spanish, etc. Media categories allow for additional customized business rules that are integrated with Ad Copy Wizard that help in automation. The categories selected for the advertising media during the quality assurance process will be transferred over to the Ad Copy Wizard. When a user next selects a piece of advertising media content from the library, the selected advertising media within the interface may be right clicked to enable a view of the specific media categories that have been associated with the media content. This functionality prohibits questionable content on a per network/daypart basis and resides on the back-end of the ACW (Ad Copy Wizard) and is configurable by the user. If a piece of advertising media has been tied to a particular questionable content category and a business rule has been set-up not to run that particular content category on certain networks/dayparts, then the user will be allowed to add the advertising media spot to the clients' library and will be prompted with a following "Restricted Spots and "Set Limits" notification as shown in FIG. 10B. The functionality further enables an admin GUI interface where the networks and dayparts can be self- managed. Advertising subject matter categories can be selected within the content quality assurance process (QA) and are also transferred to the Ad Copy Wizard. A user can view the category associated with a particular piece of media by selecting the media from the content library and right clicking thereon. Current Categories are: Alcohol, Firearms, Tobacco, Adult Content, Gambling & Drugs but is customizable for each client.

The ability to track an advertising medias associated category enables the prohibition of questionable content on a per network/daypart reference and may be configured as desired. If a piece of media that has been tied to a questionable content category and a business rule has been set-up not to run that media category on certain networks/dayparts, then the user will be allowed to add the spot to the clients' library but will be prompted with a "Restricted Spots and "Set Limits" notification. The restricted spots notification will indicate the Zones, Networks, Categories and Dayparts for the restriction. The set limits notification will provide the user with the ability to set limits for the particular spot on a network. The functionality further includes an admin GUI interface where the networks and dayparts can be self-managed.

As will be realized by one skilled in the art, various other types of advertising categories would also be displayable by the graphical report 1002. The categories can be filtered by day, week, month and year using buttons 1004. The report can be exported as PDF through control button 1006.

Figure 11:
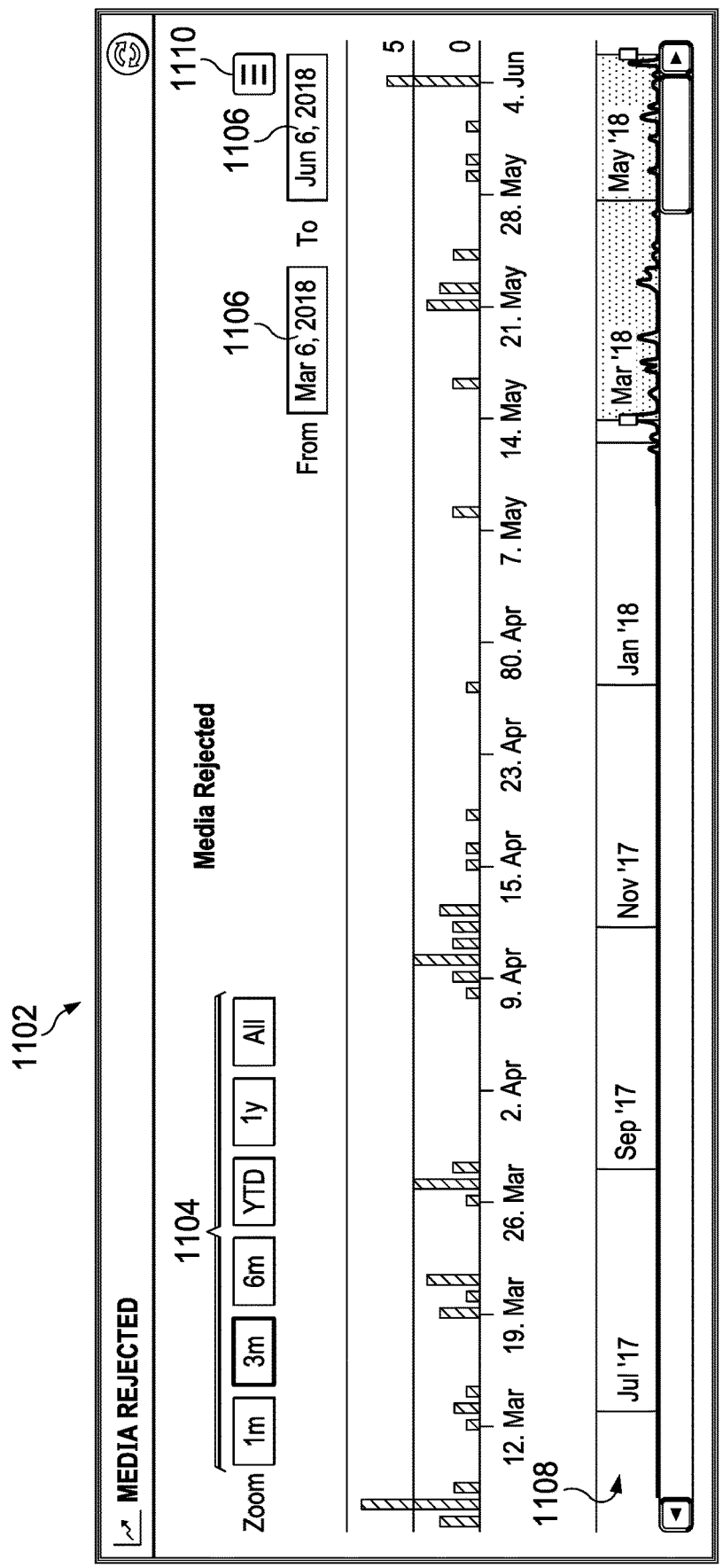
FIG. 11 illustrates a media rejected report.

The final report displayable through the management dashboard 502 is the media rejected report 1102 as illustrated in FIG. 11. The media rejected report 1102 displays the media rejected by the advertising media management system 102 listed by date. This graphical report can be filtered by increments of one month, three months, six months, year-to-date, one year or all using control buttons 1104. Alternatively, the media rejected can be displayed by a selected date range using date fields 1106. Using scrollbar 1108, the user has the ability to scroll through a specific date range and review the media rejected with respect to particular dates. This information may be exported as a PDF using control button 1110.

Referring now back to FIG. 5, the queue functionalities 506 include a variety of functionalities including a master queue 530, an operation center queue 532 and media tech queue 534. The master queue 530 includes a list of all content received, assigned, approved and rejected by the advertising media management system 102. The operation center queue 532 includes a list of all work routed to each operation center. The media tech queue 534 relates to content quality assurance and comprises the media tech's queue. All intake advertising media content is displayed and manage by media techs and managed through the queue functionalities 506 of the advertising media management system 102. The user can navigate between the master queue 530, the operation center queue 532 and the media tech queue 534 using a navigation bar in the queue menu associated with the queue functionalities 506.

The master queue 530 may be displayed within the master queue global overview as illustrated in FIG. 12. The master queue 530 contains all of the content listed in the operation centers queue 532 and media techs content queues 534. The user can toggle between each of the queues in order to view the workload pending within each queue. Both master and ops center queues allow the user to reassign work across operation centers and media techs. This enables a true virtualized operation center for managing media intake through quality assurance, association and distribution. The master queue 530 has the capability of performing a number of operations. These operations include the ability to restore a rejected piece of advertising media content through a restore operation. The master queue 530 has the ability to indefinitely reject a piece of advertising media content. The master queue 530 provides the ability to reassign advertising media content across multiple operation centers. The master queue 530 further provides the ability to view tags that are associated with particular pieces of advertising media content including a longform tag and a trim tag. The master queue 530 may also be used to establish a pending approval indication for a particular piece of advertising media. The pending approval indication indicates that a piece of media has been sent to a distribution list for approval. This media could have questionable content that requires additional approval. If the advertising media is currently rejected it could be restored at a later time or rejected indefinitely. Advanced search options are also available through the master queue 530.

The master queue 530 lists all of the work within specific queues for display in window 1202 with a variety of information including media ID 1204, status 1206, media name 1208, assigned operation center 1210, assigned media tech 1212, content upload date 1214, last action date 1216 and tags 1218 indicating the need for trim or longform content. Interface button 1220 provides the ability to toggle between content quality assurance (QA) and media approval queues. Interface button 1222 provides the user with the ability to view established operation centers and work within each different operation center. Interface button 1224 provides a user with the ability to review media techs that have been assigned by the operation center. The action buttons 1226 enable various actions such as reassigning of content across operation centers and/or media techs to be taken with respect to associated advertising media content.

Within the display window 1202 rejected content is highlighted in a predetermined color. The media ID 1204 will be updated from the quality assurance ID to a spot ID upon approval of the content by the quality assurance process as described hereinabove. The master queue view as shown in FIG. 12 is only available to administrator and media tech users but is completely customizable based on a client's needs. Media tech users will have the ability to view their assigned operation center queues 532 and their specific work queues 534.

At the top of the master queue global view of FIG. 12, there are four icons having a numeric value depicted with each. The icons include total 1226 (indicating total number of advertising media content), pending approval 1228 (indicating total number of advertising media content needing approval), approved 1230 (indicating total number of advertising media content that have been approved) and rejected 1232 (indicating total number of advertising media content that have been rejected). The value is the daily value total residing along with the stats of that particular queue. Each quick stat can be manually actuated to filter the specific info for that page.

Rejected content is highlighted in a predetermined color as mentioned hereinabove when displayed within the master content queue 530. This is for both rejected and rejected indefinitely advertising media content. By actuating an associated comment icon 1226 located under the action column 1219, a user may view any comments associated with a rejection.

Another type of advertising media content that may be indicated within the master queue 530 comprises tagged content. Tagged content comprises either content requiring Trim or content requiring Longform. If a piece of content is received that is either over/under an available timeslot duration and/or requiring trim the content will be tagged with "Trim." The Media Tech can claim content needing to be trimmed and conduct the trim operation. Once trimmed, there is an automated workflow as will be further described hereinbelow for ingesting the trim piece of content back into the advertising media management system 102. Post trim content will be updated with the latest trim version. The original copy of the content will be archived, and the audit log will depict media transaction and status, i.e. pending trim, trimmed and then approved.

If a piece of advertising media content has been "Rejected Indefinitely," management can restore the rejected piece of content through the restore function. The user will be prompted for confirmation prior to restoring. The advertising media content will be allowed to be reclaimed. If a piece of content has not been "Rejected Indefinitely," management can reject the content indefinitely through the reject indefinitely function. Any pending trim content will not have any preview generated when the content is received. If the pending trim content is deemed to be digital upon reviewing the media tech's local folder, the media tech can either continue to trim the content, reject or convert the content to digital. Converting the content to digital will generate a preview for the content and allow it to pass outside of the duration parameters. Conversion to digital process will also tag the content as digital within the master and media library. The advertising content will at first disappear from the media techs queue 534 but will reappear upon the preview being generated.

If a piece of advertising media content needs to be purged or not made available for association, a media tech or management user can do so by selecting the purge action button within the media library 508. Clicking the purge button will prompt the user with a window to provide details and reasons for the purge that will be sent to a distribution list. If advertising media content needs to be purged or not made available for association, a user can do so by selecting the purge action button within the media library 508. Actuating the purge button will prompt the user with a window to enter details and reasons of the purge that will be sent to a distribution list. Once the media has been purged, the status within the library will change from approved/associated to "purged." At this point, any purged content will also display a "restore" action button within the media library 508. The content can be restored to an active status at any point. The user will be prompted with a window to provide detail/reason of the restore and sent to a distribution list for notification.

The operation center queue 532 includes all advertising media content associated with a particular operations center within a particular geographic area or assigned thereto by an administrative user. The advertising media content stored within the operation center queue 532 would include similar information to that discussed with respect to the master queue 530 including media ID, status, media name, ISCI, operation center assigned, media tech assigned, data content upload, last action date and tags.

The media tech queue 534 provides a listing of advertising media content that may be accessed by a particular media tech. The queue provides the ability to quick claim content into a queue, provide thumbnail tag displays of content, enable preview/play of advertising media content, enable downloading of a low-res version of advertising media content, provide file information on displayed advertising content, provide approve and reject with respect to advertising content and provide the ability to tag media for questionable content.

Figure 14:
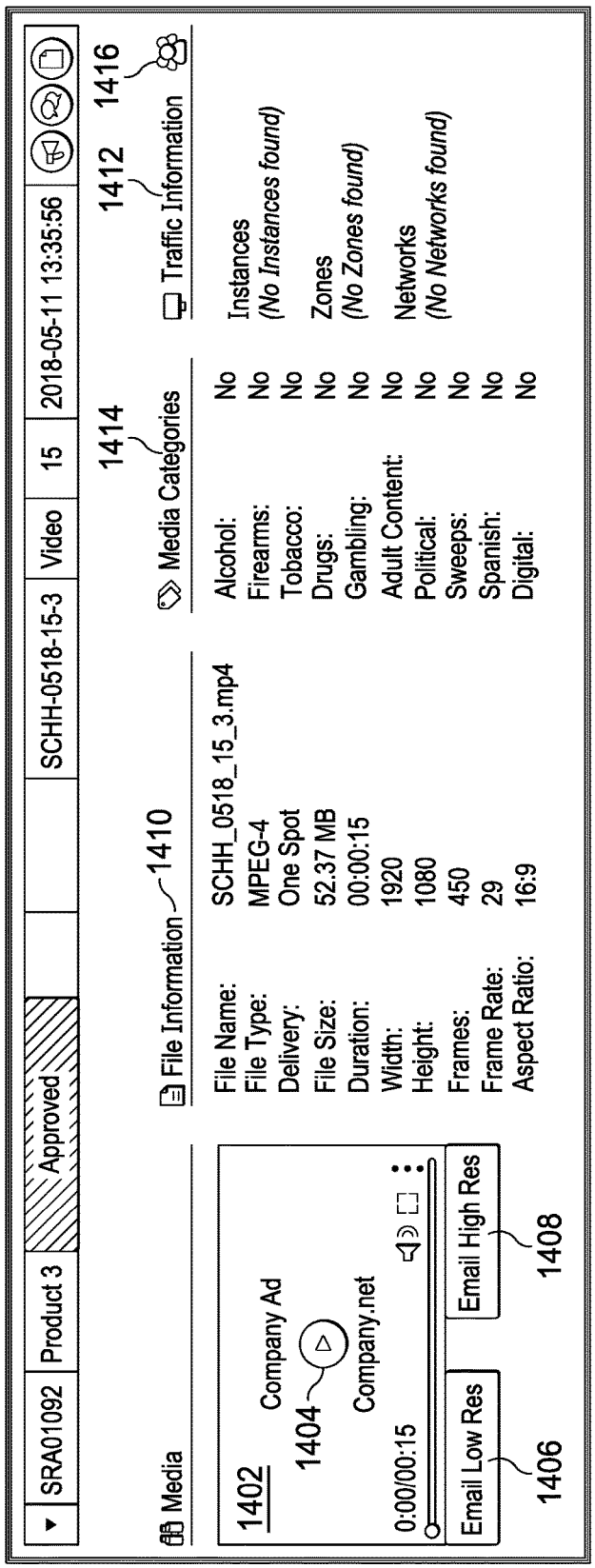
FIG. 14 illustrates an individual advertising media record.

Referring now back to FIG. 5, the media library functionalities 508 display a list of all approved content with its associated status as shown in FIGS. 13 and 14. The media library 508 provides the user a complete list of all media from all advertising clients. If any user uploads a file to the advertising media management system 102, the file will appear in the screen shown in FIG. 13. The user can search for media within the media library 508 using the advanced search functionality 1302. The media library 508 displays all content that has been downloaded into the advertising media management system 102 for display in the window 1304. A media record within a row that is not associated typically displays information in a plurality of associated columns including the spot ID 1306, a title 1308 of the advertising media content, a status 1310 of the advertising media content (rejected, approved, associated, distributed, pending trim, generating preview, pending quality control, pending approval), client ID 1312, client name 1314, ISCI 1316, media type 1318, content length 1320, last updated date 1322 and action 1324.

The action column 1324 includes a number of action buttons including a file path button, an archive button, non-encode button, spot replace button, purge button, restore button and comments button. The file path button provides file path information to the original advertising media content. The non-encode button enables a user to notify a distribution list that a specific piece of media has not been associated and is therefore not encoded. This action button is only visible to the user if the media record has not been associated. The spot replace button enables the user to notify a distribution list that the selected media/spot content needs to be replaced. The action button is only visible to the user if a media record has been associated, processed and delivered. The comments button enables a user to view all comments related to the piece of content and will show what phase of the work flow the comments were provided. The purge button may be used to purge a piece of advertising media content which will make the media unavailable for association. The restore button enables a user to restore a previously purged piece of content back into active status. The restore button is only visible to purged content.

Referring now to FIG. 14, when an individual advertising media record is opened other functionalities become available about the individual record. A thumbnail 1402 of the content tag is displayed in the expanded record. By actuating a play button 1404, the media within the thumbnail may be played/previewed. Actuation button 1406 enables emailing of a low-res version of the advertising media content. Link 1408 enables emailing of a link for a high-resolution of the media. File information is stored within a window 1410. File information includes details such as file name, file type, delivery, file size, duration, width, height, frames, frame rate and aspect ratio. Traffic information may be displayed in window 1412. Traffic information may display information related to traffic and billing instance, zones and networks. Media category information is displayed in window 1414. Traffic information allows for distribution throughout the day which is also a differentiator for the media management system. Media categories information may comprise information such as whether the content is related to alcohol, tobacco, firearms, drugs, gambling, adult content, political, sweeps, Spanish or digital.

A user icon 1416 provides a pop up window giving the user visibility to each person who conducted an action with respect to the advertising media content throughout the workflow. The pop-up window will provide information concerning the display media center assigned, the display media center tech who perform quality control on the content, any additional approver required by the process, traffic team support members associated with in ACW and enables email communications to be carried out each of these parties.

Referring now back FIG. 13, the advanced search button 1302 enables searches to be performed using a variety of criteria. These criteria include intake (selection of specific intake or add aggregator); media type (video or image); association status (associated or not associated); quality control status (not associated or associated); media ID (spot ID assigned if known); spot name (media name); client ID; client name; ISCI code; length (length of media); rejection category; digital content; date uploaded (upload date) and date range (date range of media for any action taken).

Figure 15:
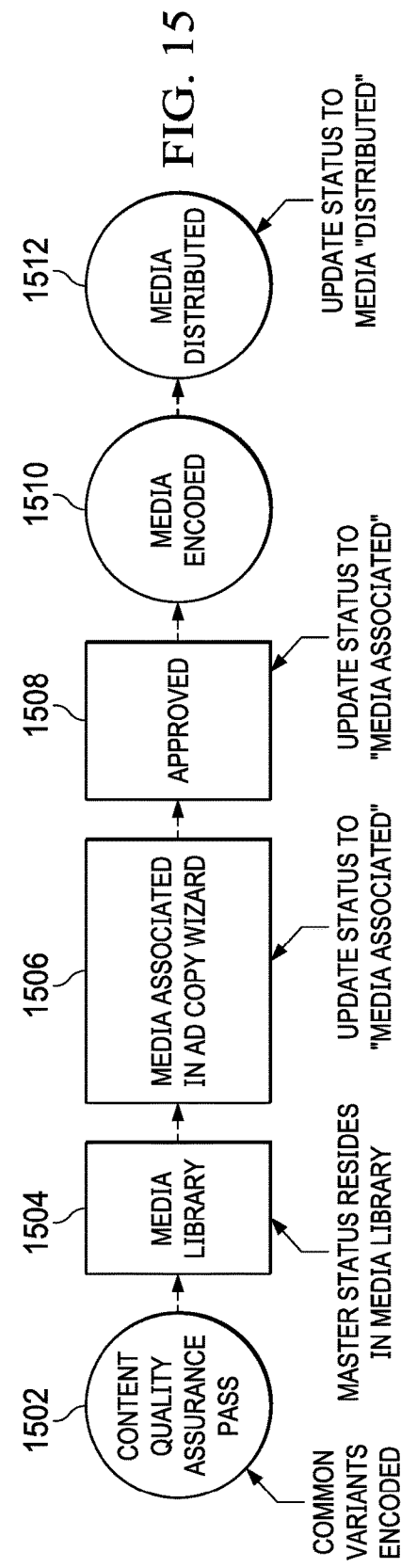
FIG. 15 illustrates a media library status workflow.

Referring now to FIG. 15, there is illustrated a media library status. Once a content has passed the quality assurance process at 1502 and has common variants encoded, the information is located within the media library 1504. The master status resides within the media library. Responsive to the update of status within the media library at 1504 the media is associated within the ad copy wizard at 1506. Once the updated status of the associated media is approved at 1508, the media may be encoded at 1510 and distributed at 1512. The status of the media is updated to distributed. The various statuses associated with a particular media include "generating preview" where in the media is ingested not yet transcoding, pending trim, pending quality control, approved, rejected, pending approval, associated with immediate is associated in the ad copy wizard and distributed when the media is distributed.

Referring now back to FIG. 5, the required media functionalities 504 provide a list of pending associated media that have been received with potential percentage matches and non-encode notifications. The required media functionalities 504, as more particularly illustrated in FIGS. 16A and 16B, list all orders from ACW (ad copy wizard) that require media content in a window 1602. When an order is expanded, possible matches will be provided for consideration. The required media functionality 504 further provides the ability to query the ad copy wizard new spots page and provides any relative matches of content to ad copy by percent match. A quick view of the number of orders is displayed by today 1604, tomorrow 1606, 2-3 days from now 1608 and 4+days from now 1610. Each record's first run date 1612 is color-coded to match the Quickview dashboard at the top of the page. Actuation button 1614 may be used to send a non-encoded notification to a distribution list detailing orders that have no content associated with it for the day.

Figure 17:
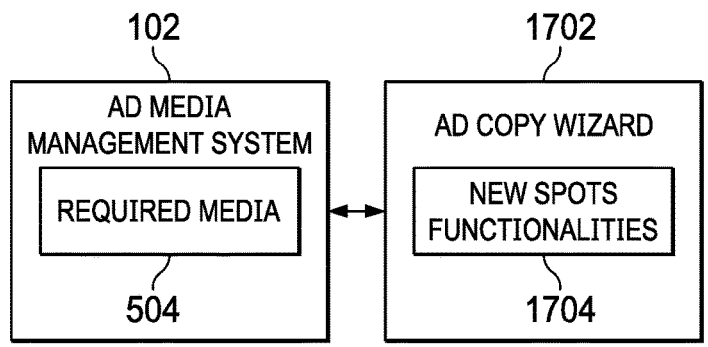
FIG. 17 illustrates the advertising media management system interacting with the ad copy wizard (ACW)

Referring now to FIG. 17, there is illustrated the manner in which the advertising media management system 102 provides the required media functionalities 504 that may interact with the ad copy wizard (ACW) 1702 to provide access to various advertising media content. As described above, required media functionality 508 lists all orders from the ACW 1702 including possible matches for orders that are expanded. The required media functionalities 504 provides the ability to query the ad copy wizard new spots functionalities 1704 to provide relative matches of content by percentage match.

The required media functionalities 504 in the advertising media management system 1022 send out a non-encode notifications. This may be accomplished through a non-encode required media process 526 or a non-encode media library process 528. Within the non-encode required media notification 526, a non-encode notification for the entire current day's list of required media that is needed is provided by selecting the non-encode button on the required media page 504 to initiate the transmission or to select an individual record. Within the media library 508 and/or the required media page 504, a user can select a single record to have a non-encode notification sent. In the required media page 504, every record will have the ability to have a non-encode notification sent. However, in the media library 508, the non-encode action button will only appear for those records that have not been already associated.

Figure 18:
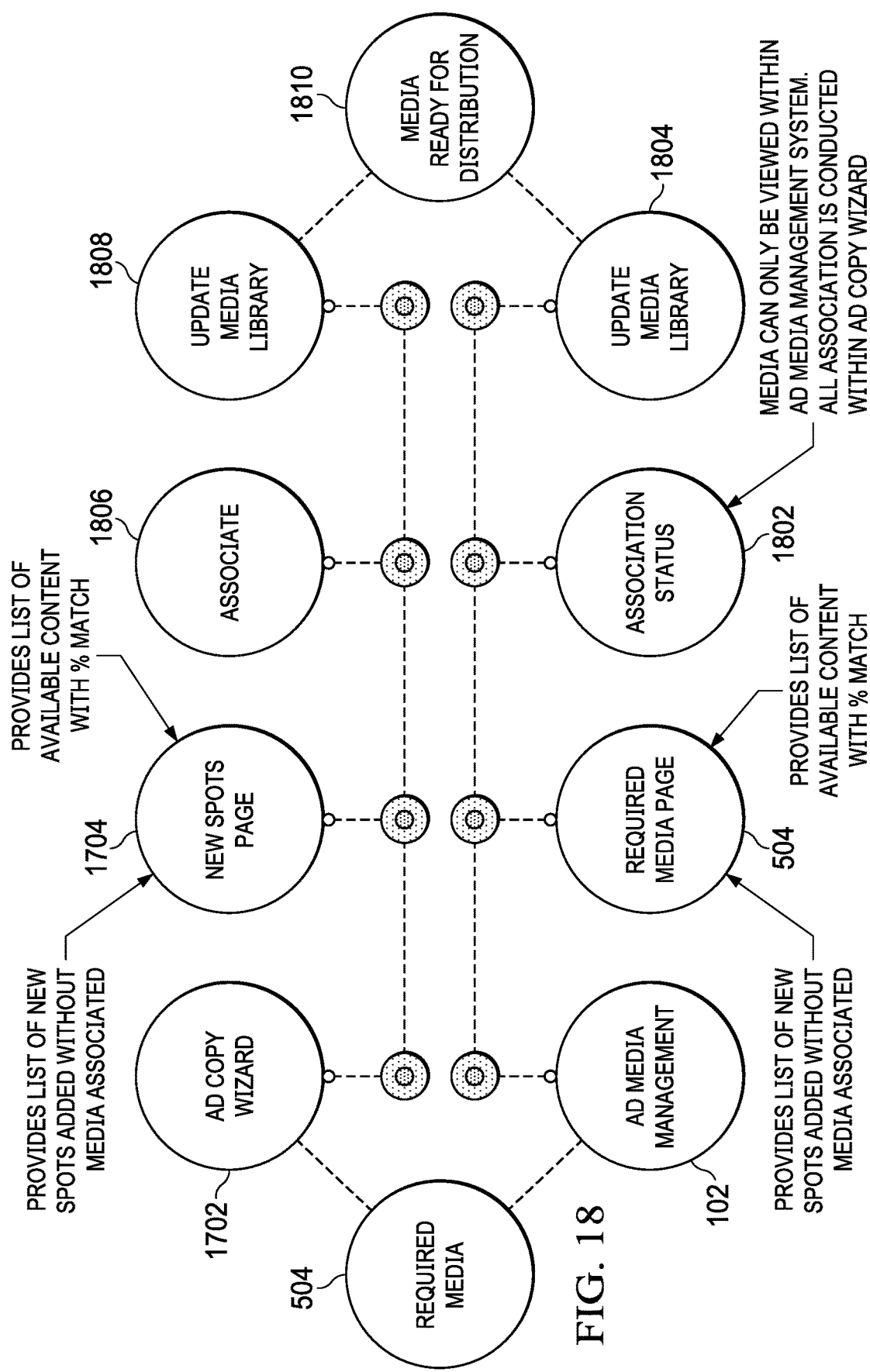
FIG. 18 illustrates the workflow process of the operation of the required media functionalities as illustrated in FIG. 17.

Referring now to FIG. 18, there is illustrated the workflow process of the operation of the required media functionalities 504 as illustrated in FIG. 17, the required media functionalities 504 may access media content detail within the ad copy wizard 1702 or the advertising media management system 102. If the ad copy wizard 1702 is accessed, the new spots page 1704 may be accessed by the user. The new spots page 1704 provides a list of new spots that have been added to the system's database that have not previously been media associated. Additionally, within the new spots page 1704 searches may be carried out that provide a list of available content that meets search parameters within a certain percentage match. Advertising media content located upon the new spots page can then be associated with a particular media for presentation within advertising slots associated with the media at 1806. The associated media is updated within the media library at 1808, and the updated media is ready for distribution at 1810.

Alternatively, if the required media accesses the advertising media management system 102, the required media functionalities 504 can provide a list of new spots added that are currently without media association or enable a listing of available content based upon search parameters falling within a percentage match. The selected media association status can only then be viewed at 1802 within the advertising media management system 102 since all association is conducted within the ad copy wizard 1702. The media library is updated at 1804, and the media is ready for distribution at 1810 as described previously.

Figure 19:
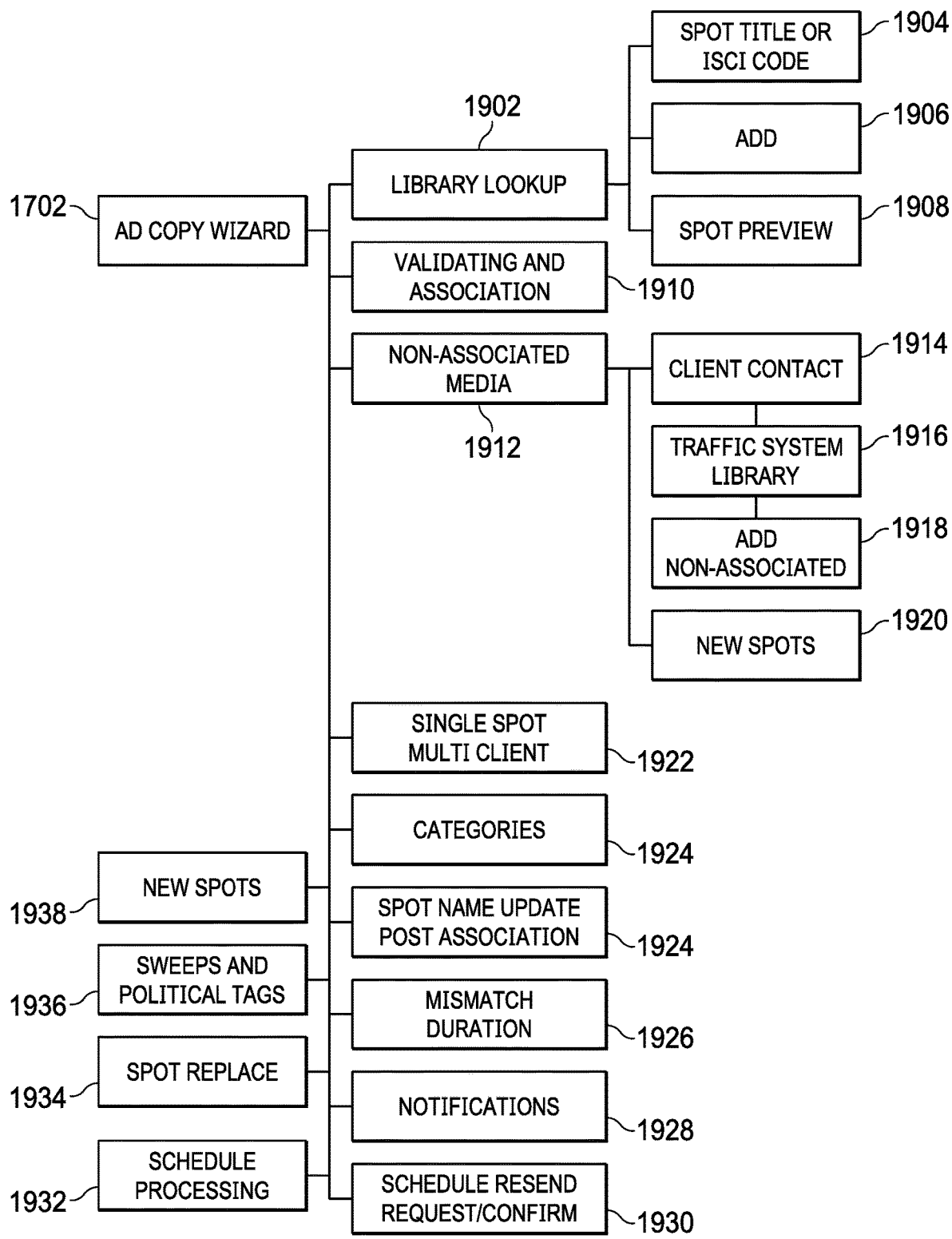
FIG. 19 illustrates the various functionalities associated with the ad copy wizard.

Referring now to FIG. 19, there is more particularly illustrated the various functionalities associated with the ad copy wizard 1702. The ad copy wizard 1702 enables a user to conduct media associations to ad copy instruction by providing the user with relevant percent match option for media that have been received. A media association is a match of clients ad copy instructions to the physical quality assured media received through the media management system. Several enhancements and functionalities are provided by the ad copy wizard 1702 for the advertising media management system 102. The functionalities include the automatic generation of spot ID, the ability to access both traffic and billing systems and advertising media management system libraries for queries, the ability to preview spots within the advertising media management system library, the ability to view categories associated with spots during content quality assurance processing, the ability to view rejected and/or spots that have not been content quality assurance approved within the advertising media management system library, the ability to prevent mismatch durations within a contract, the ability to restrict content by zone, network in part for questionable content categories when tagged by the system, the ability to search by spot name or ISCI, the provision of percent match options based upon spot name and ISCI providers exact match is provided if received, the ability to create non-associated spots for any order that physical media has not yet received but is expected, the ability to tag non-associated spots as sweeps or per medical enabling a user to filter by category, the ability to assign a single spot to multiple clients, the new spots page for all non-associated media, the ability to submit schedule resend requested confirmations from the ad copy wizard 1702, the ability to mark flags as encoded and received within the spot profile and the ability to correct incorrect spot titles with physical media uploaded through the advertising media management system 102.

Figure 20:
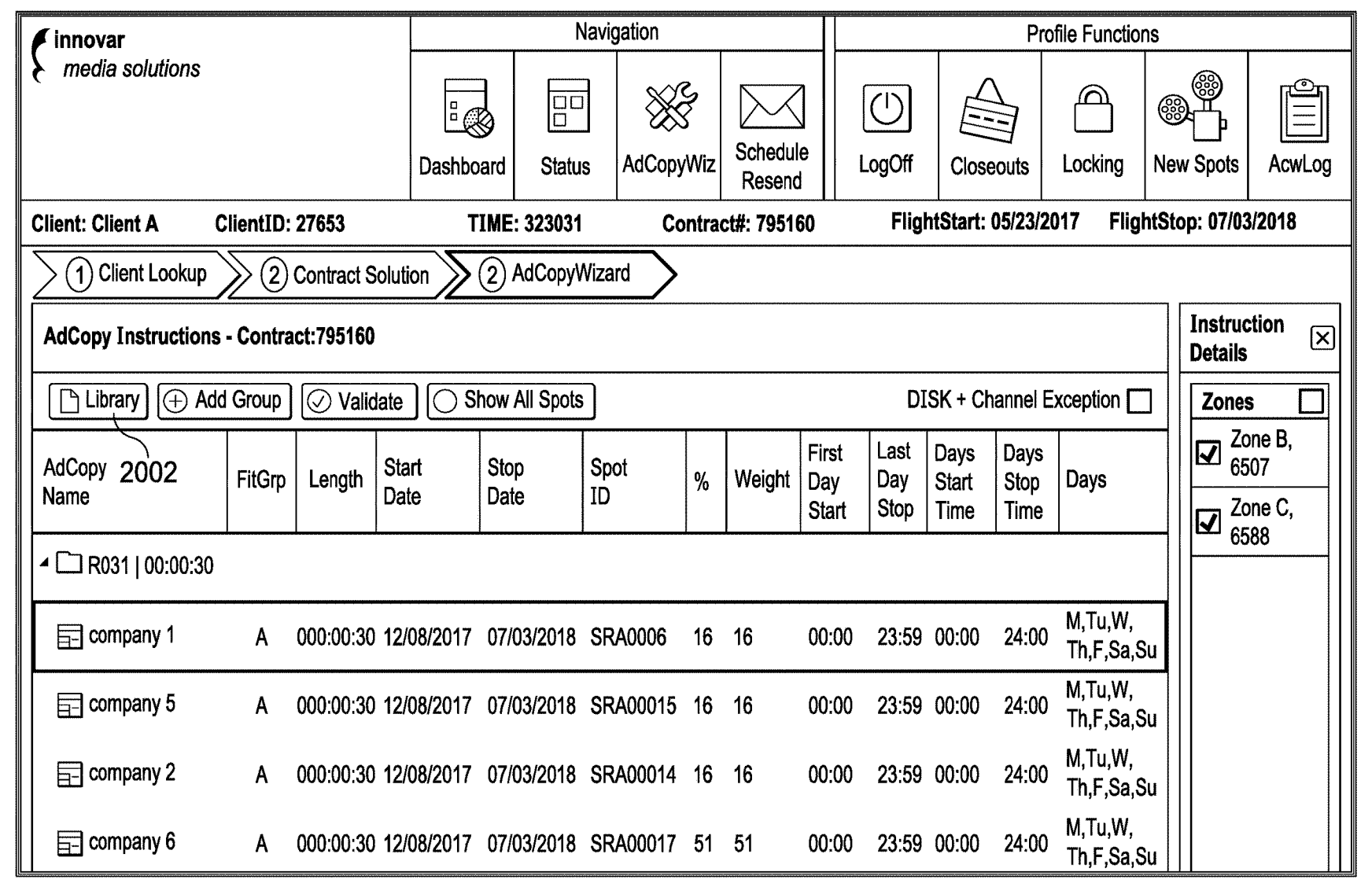

Library look up functionalities 1902 are provided as illustrated generally in FIG. 20. Once a contract is selected, the user may actuate the library button 2002 to query a client's current traffic system library to locate media that needs to be associated as shown in FIG. 20. The user can enter either a spot title or ISCI code 1904 in a data field of the interface appearing responsive to actuation of the library button 2002 to perform a search of the traffic system library. If no results are found, an ad process 1906 may be actuated that causes the ad control wizard to query the advertising media management system media library to determine if the media has been received. If the media has been received or if there are media with similar titles, the user is provided with a percent match. If the user is not certain that media presented responsive to the search is accurate, a spot preview functionality 1908 enables the user to view content using this spot preview feature.

Invalidating and associating functionality 1910 within the ad copy wizard 1702 enables the user to associate selected media to ad copy instructions within the ad copy wizard 1702. Within the validation and association process, the user will validate things such as account for dates, zones, networks, confirming length of spot, confirming no duplicate networks or duplicate spots confirming all zones are in an approved status in that Traffic system is ready. The validation and association process 1910 further enables submission of contracts associated with the spot and receives a successful notification of the validation process. Non-associated media functionalities 1912 to add a spot to a client library within the ad copy wizard 1702 that includes ad copy instructions but has no physical media yet received. The user can select a client contract at 1914 and group to be presented with a list of spots located in the traffic system library. This spot is not located in the current traffic system, the user may query the advertising media management traffic system library 1916 by entering the spot name or ISCI code and clicking on add non-associated indication. The user can provide information relating to the advertising media content such as type, lengths, sweeps type, expiration date and save the entry. Once saved, information relating to copy instruction may be provided. Once non-associated ad copy has been successfully validated, the record is available on the new spots page 1704. The user can expand the record with the new spots page 1920 and a list of potential media matches associated therewith. The user may toggle between the media displayed to see the association information such as spot ID and file information. If the user determines that they have a good match selection, the user can associate the media to the ad copy by clicking on the associate media actuation button at 1918. Once the media and ad copy are associated through the new spots page 1920 within the ad copy wizard 1702, the ad media management system 102 will update the status to media associated within the media library 508.

The single spot, multi-client functionality 1922 is used for single spots that may need to be associated with multiple clients within a same traffic system. The ad copy wizard 1702 will enable a user to select an already associated spot, issue a new spot ID, associate the spot to the new client and submit the spot to be encoded to the client specifications. This process involves selecting a new client within the ad copy wizard client look up. Next, a contract is selected and an order line for the ad copy is selected. The library look up is conducted by entering the spot name or ISCI code into the search field. A previously associated media is selected, and the ad copy wizard 1702 will issue a new spot ID via the ad media management system 1702. The spot having the new spot ID is then selected and approved. The user is prompted to validate the contract when they are notified that the spot is already associated with a different client. By approving the spot, a duplicate spot is created for the client. Upon acceptance a spot is given, a new spot ID is routed to the ad media management system approval queue for quality control. Once approved, media will be routed to the client's transcoder for encoding to the specific client specifications.

The categories selected upon content quality assurance within the advertising media management system 102 are transferred into the ad copy wizard 1702 using the categories function 1924. When a user goes to select a piece of media from the media library, the user can view whether the media has been tied to a specific category. The category functionality 1924 prohibits questionable content on a per network/daypart and resides on the backend of the ad copy wizard 1702 and is configured by a user. This provides a key differentiator from existing systems. If a piece of media that has been tied to a questionable content category and a business rule has been set up not to run on certain network/dayparts, the user will be allowed to add the spot to the client's library and will be prompted to enter information regarding restricted spots notification.

If ad copy instructions during a non-association do not match the physical media name, the spot name will be updated with the physical media name upon association and the client libraries updated in both the traffic system and order entry system using the spot name update post association function 1924. A user is able to locate a piece of media within the media library 1508 that does not match the duration with the order online using mismatch duration functionalities. The user will still have visibility to all content within the traffic library 1508; however if there is a duration mismatch, the mismatch duration functionalities 1926 of ad copy wizard 1702 will not allow users to select the content and add it to a group.

Notification functionalities 1928 allow for notification options within the ad copy wizard 1704 to support workflow of the advertising media management system 102. These include schedule resend request, schedule resend confirmation, schedule processing and spot replace. Once the notification functionalities 1928 are selected through the user interface, the user will have the option to choose the notification type through a drop-down screen.

The schedule resend request/confirm functionality 1930 enables schedule resend notifications to be submitted to an individual team member for or group of team members. This is accomplished through a user interface accepting for a resend request including a variety of parameters such as including notification type, spot ID, new spot action, HQ, areas, zones, networks, start date, end date, notes, sent by indication, created by indication, distribution list use and recipients. A resend confirmation request would be established using a user interface for entering information such as notification type, spot ID, new spot action, HQ, zones, networks, start date, end date, notes, sent by indication, created by indication, distribution list use and recipients. Schedule processing functionalities 1932 enables the scheduling of ad content schedule processing using information such as notification type, type, area, start date, end date, notes, sent by, created by, distribution list and recipients. A spot replaced notification 1934 enables the creation of spot replaced notifications responsive to input such as notification type, HQ, old spot ID, new spot ID, length, zones, networks, start date, and date, notes, sent by, created by, distribution list and recipients.

Sweeps and political tags functionality 1936 provides the ability to tag a piece of media/ad copy with sweeps or political indications to be displayed in the new spots page 1938. Once tagged, copy will be automatically given a first-run date of closeout +1 within the new spots page 1938 if unassociated. Additionally, there will be a column that will have the record tag. This will allow users to filter and see any sweeps and political ad copy at the top of the new spots page and be able to prioritize the association as the media is received. To tag a piece of ad copy as sweeps or political using the functionality 1936, the user selects the copy within the library and double clicks. The user will then be prompted with the ability to change a number of fields including the ability of the sweeps type. Once the tag is selected, the user can save the record with the indication. The new spots page 1938 enables media to be associated with the correct ad copy instructions for any non-associated media. Non-associated media comprises ad copy instructions added to the client's library without the physical media being received. The new spots page 1938 provides a list of all non-associated media. Once a record is expanded, the user is provided with any media options based upon the percent tax logic and threshold.

Referring now back to FIG. 5, the audit logs 510 provide for two types of audit logs within the advertising media management system 102. The media tracker log 544 tracks media from ingest through delivery and captures all users who conduct any action. A second option is the application tracker log 546 which tracks all functional task processed by a user or system. The media tracker audit log functionality 544 displays a list of most recent audit trail specifications to a particular media. The media audit log functionality also has the ability to show additional records per page and includes an advanced search capability to narrow down specific search criteria. The application tracker log functionality 546 displays a list of most recent audit trails specific to the application/system. The functionality 546 has the ability to show additional records per page and also has an advanced search capability to narrow down specific search criteria. The advanced search capabilities of both the application tracker log functionalities 546 and media tracker log functionalities 544 enable a user to search based upon the registered user within the application, the media ID of the uploaded media, a particular component process within the workflow, any description of action completed by the system processing and a date range of media for any particular action taken.

The application administration functionalities 512 enable a user with administrative privileges to assign settings to various areas of the application. The areas within the application that may have settings assigned include archive 548, email distributions 550, aggregators 551, intake management 552, Media Techs 554, operation centers 556, rejection category 558 and users 560. The archive settings include controlling the list of archive repositories enabled within the system, providing the ability to add new, edit and enable or disable content. The email distribution settings enable display of a list of all email distribution list enabled within the system. Email distribution settings provides the ability to add new email distributions, edit email distribution list, add or edit members of a distribution list or provide notification confirmation of deleting email distribution lists. Aggregator settings provide a list of all intake/ad aggregators with file location. The functionalities provide the ability to add new information, to edit information, delete information and provide notification of confirmations of deleting operation centers. The media tech settings displays a list of all media techs enabled within the system. Using the settings, new media techs may be as added, existing media tech may be edited or deleted and notifications may be provided of confirmation of the deletion of a media tech. The operation center setting displays a list of all operation centers enabled within the system. These listings may be configured to add new operation centers, edit and delete existing operation centers and provide notifications confirming deletion of operation centers. The user settings enable the display of all users within the system and the addition editing or enabling or disabling of the user. The user settings further enable the setting of a role for a particular user to establish their permission-based rights within the system.

Six types of users can be established within the system. These user types are customizable based upon the client's needs. An administrator has access to all pages, applications function and the ability to edit and alter our enabled within the system. A technician comprises media techs that have access to the operation center, their queue, required media and media libraries and has the ability to email and download low-res spots as well as the ability to email hi-res links to spots for preview. Media techs have the ability to approve/reject questionable content via email. Digital users have media library access only without the ability to take any actions. Digital users have the ability to email and download low-res spots and the ability to email hi-res links to a spot for preview. Fulfillment users have access to the media library and all functions within the media library. They have access to required media pages and all functionality within the media pages as well as ad copy wizard access. Kernel users have media library access without the ability to take any actions. They have the ability to email and download low-res spots and the ability to email hi-res links to a spot for preview. Remnant/marketing users have limited functionality with access to the media library and the ability to manually associate content to clients outside of the ad copy wizard. These users also have the functionality to reprocess media and assign a new spot ID. Remnant/marketing users have the capability to assign a spot ID to any historical content which was ingested with a previously assigned spot ID.

Figure 21:
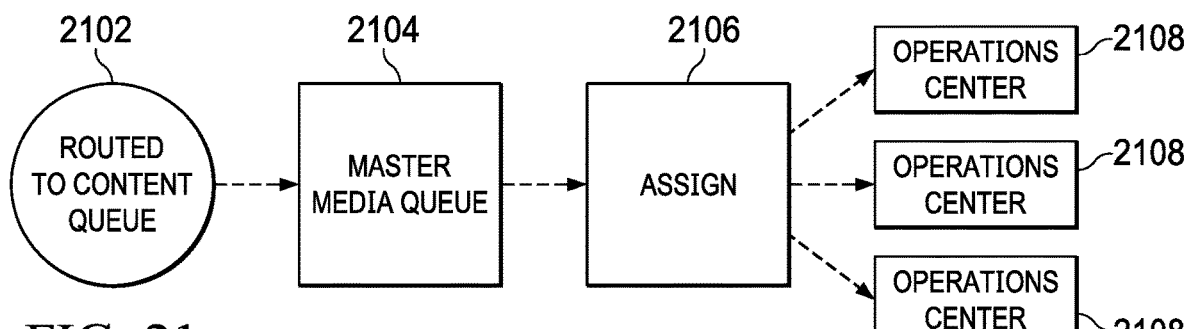
FIG. 21 illustrates the quality assurance workflow for content that been ingested by the advertising media management system.

Various workflows may be implemented using the above described advertising media management system 102 in conjunction with the ad copy wizard 1702. Referring now to FIG. 21, there is generally illustrated the quality assurance workflow for content that has been ingested by the advertising media management system 102. Content is ingested when the content is uploaded into the advertising media management system 102. The process of FIG. 21 distributes uploaded advertising media to an appropriate ops center and media technician work queues. Advertising media that has been uploaded into the advertising media management system 102 is routed to an advertising media content queue at 2102. This information is routed to the master media queue 2104. Within the master media queue 2104, an assigning process 2106 assigns each of the ingested media content to one of a number of operations centers 2108. The assignment process 2106 geo balances assignment of operations centers based upon location. Media techs have the ability to claim work from their assigned operations center 2108. As described previously, the media techs have the ability to view low-res video, approve/reject content with notification, label the category of advertising media content in categories such as alcohol, firearms, tobacco, adult content, etc., label whether he content is sweeps or political and request additional approval for questionable content. Management administrators further have the ability to reassign operation centers and/or media techs as necessary.

Figure 22:
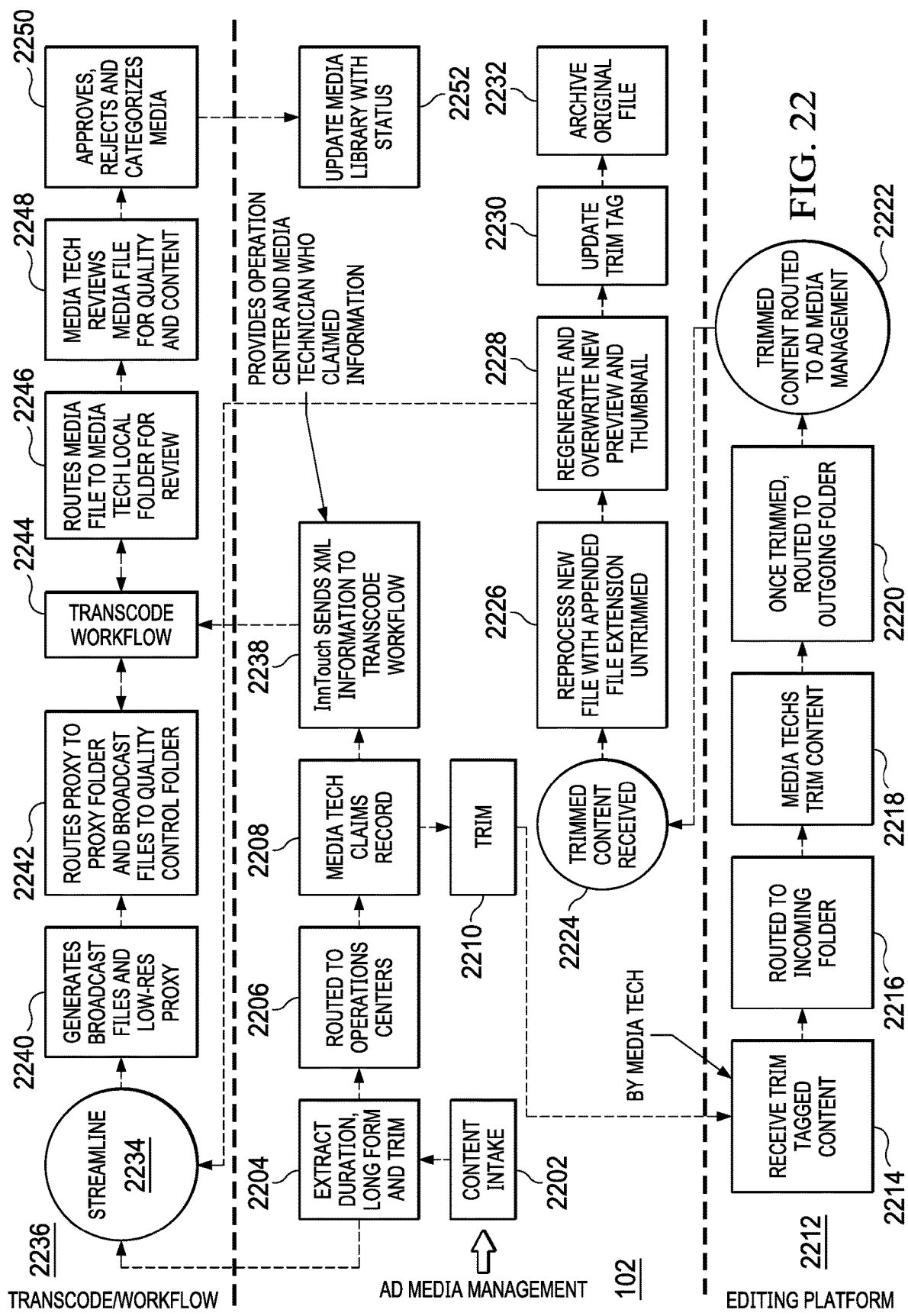
FIG. 22 illustrates the details of a quality assurance workflow.

Referring now to FIG. 22, there is more particularly illustrated the details of the quality assurance workflow that further include trim actions, wherein the content of an advertising media must be trimmed in order to meet advertising slot requirements. The advertising media content goes to the intake process at step 2202. After the intake at 2202, the exact duration, longform entry and trim requirements are determined for the media content at step 2204. For the normal quality assurance workflow process, the media content is routed to the assigned operation center at 2206. After the material is routed to the assigned operation center, a media tech may claim the record associated with the advertising media content at 2208. If there are requirements to trim the advertising media content, the process proceeds to the trim application at 2210 so that the advertising media content can be trimmed down to the necessary levels required for available advertising slots. The advertising media content to be trimmed is received at 2214 by an editing platform 2212 so that the advertising media content can be trimmed. The received content that has been tagged for trimming is routed to an incoming folder at 2216, and the media tech may trim at 2218 the advertising media content using the editing platform 2212. Once trimmed, the advertising media content is routed to an outgoing folder at step 2220 within the editing platform 2212. The trimmed content is routed back at 2222 to the advertising media management system 102. The trim content is received by the advertising management system 102 at step 2224.

The received trimmed media content is reprocessed within an appended file extension indicating the files trimmed nature at step 2226. The trim file is updated with a new trim tag at step 2230, and the original untrimmed file is archived at step 2232. The advertising media content file is regenerated and overwrites the old file with a new preview and thumbnail at step 2228. The trimmed file is forwarded to the file movement process 2234 within the transcode workflow process 2236. If the media tech determines at 2208 that no trimming is necessary for the advertising media content, the advertising media management system 102 sends XML info to transcode the workflow within the transcode/workflow process 2236.

Alternatively, at the determination of the exact advertising content duration, longform and trim information at 2204, the workflow process can also be directly connected to the backend process 2234 within the transcode/workflow operation 2236. The backend process 2234 generates at 2240 broadcast files and a low-res proxy for the advertising media content. The low-res proxy is routed to a proxy folder while broadcast files are routed to a quality control folder at 2242. This information or the information from 2238 is provided to the transcode workflow at 2244. The transcode workflow routes media files to a media tech local folder for review at 2246. The media tech reviews the media file for quality and content at 2248 and approves or rejects and categorizes the advertising media content at 2250. Responsive to the actions of the media tech the media library may be updated with the status at 2252.

Figure 23:
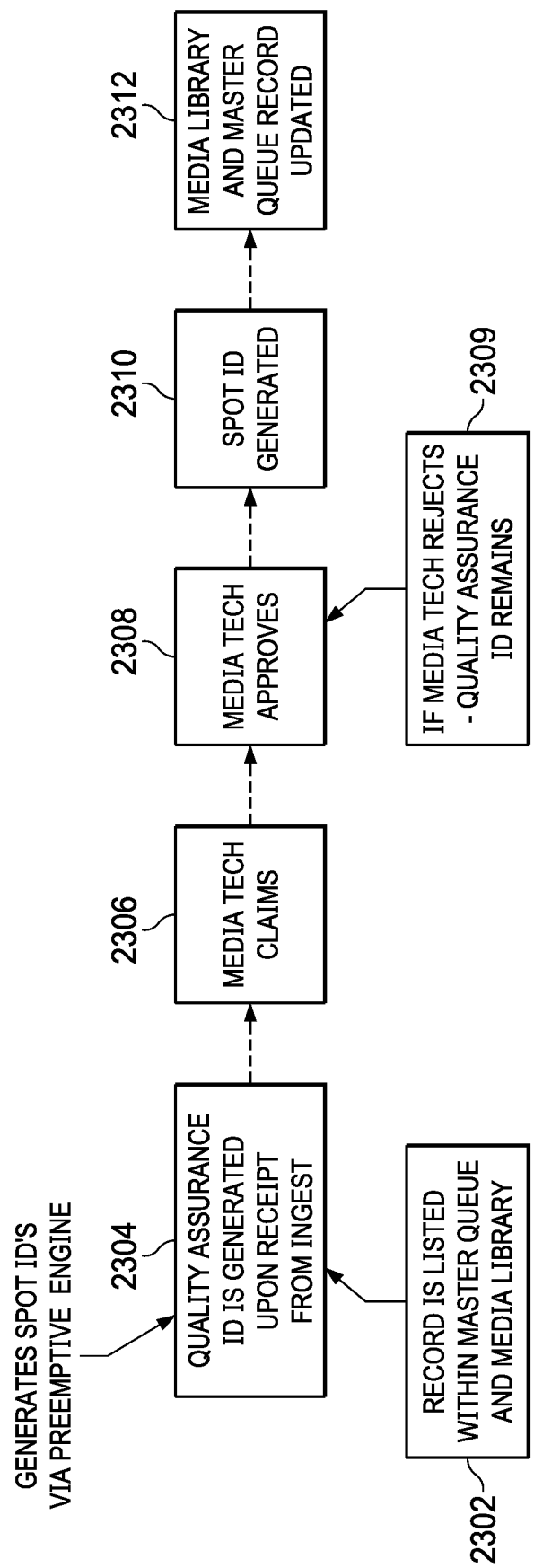
FIG. 23 illustrates the spot ID generation workflow for the system.

FIGS. 23-27 illustrate various work flow processes related to the generation of spot IDs that are associated with advertising media content by the advertising media management system 102. FIG. 23 illustrates spot ID generation workflow for the system. When a record is listed within the master queue and the media library at 2302, a quality assurance ID is generated upon receipt of the advertising media content from the ingest process at 2304. The media tech claims the advertising media content at 2306 having the associated quality assurance ID and can either approve or disapprove the content at 2308. If the file is rejected, the quality assurance ID remains associated with the file at 2309. If the media tech approves the content, a spot ID is generated at 2310 and the master library and master queue records for the advertising media content are updated at 2312. Thus, spot IDs are only generated upon approval of the quality control workflow within the advertising content via management system 102, a reserve spot ID for non-associated content within the ad copy wizard or upon reprocessing of the advertising media content within the ad copy wizard such as when multiple clients are associated with the same spot. All spot ID generation is captured within the audit logs of the advertising media management system 102.

Referring now to FIG. 24, there is more particularly illustrated the generation of spot IDs by the ad copy wizard for non-associated advertising media content. As mentioned previously, non-associated advertising media content comprises ad copy instructions with reserved spot ID's for physical media not yet received or quality assured through the media management system. Within the ad copy wizard 1702, a physical media is found to have not been received with respect to a particular identifier (non-associated). Within the ad copy wizard 1702, a user will create a non-associated advertising media content spot at 2404. A reserved spot ID is generated for the spot at 2406 and the spot is routed to the new spots page 938 for association at 2408. The physical media is received and a quality control for the media approves within the advertising media management system 102 that has a spot ID associated therewith at 2410. The spot is associated in the new spots page 938, and the reserved spot ID generated at 2406 overwrites the quality control spot ID at step 2412. The ad copy wizard logs the updated advertising media management system spot ID at 2414. The media library and master queue records are updated with the reserved spot ID at step 2416 for the non-associated spots.

Referring now to FIG. 25, there is illustrated the manner in which the ad copy wizard generates a spot ID for a reprocessed advertising media content that is being associated with a new client. When a spot is located but is currently assigned to a different client at 2502, the ad copy wizard user associates the spot with a different client at step 2504. A reserve spot ID for the same spot is generated at 2506. The spot is validated and submitted at 2508 and the new spot is added client's Traffic library at 2510. The new record is created within the advertising media management system 102 that includes the same spot info of the previous spot and a new spot ID at 2512. This record is created in both the master library and media library. The ad copy wizard then logs the updated information at step 2514.

Figure 26:
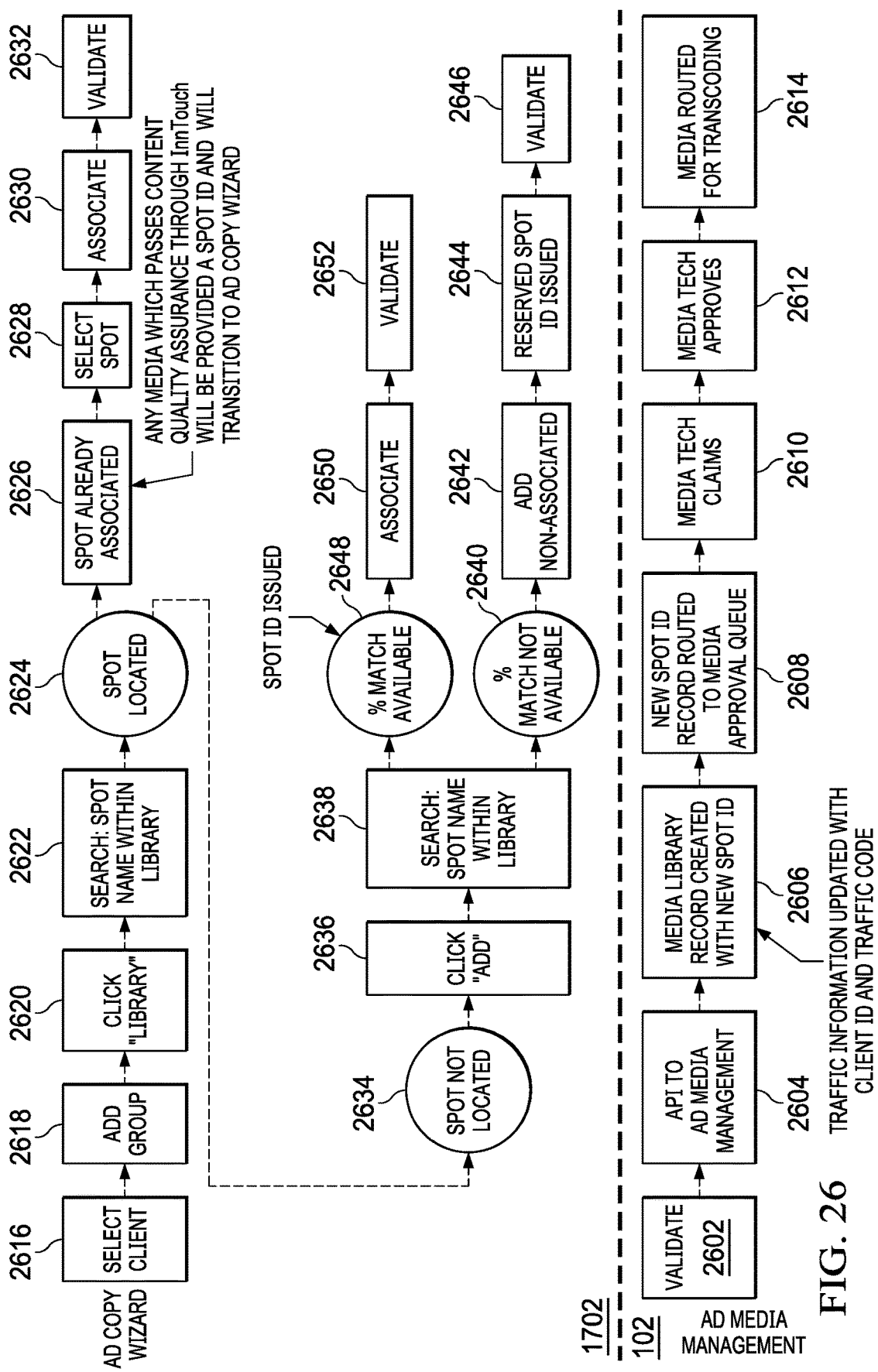
FIG. 26 illustrates a work flow diagram associated with a system generation of a reserve spot ID for a same spot for a same client but different T&B systems.

FIG. 26 illustrates the work flow diagram associated with a system generation of reserve spot ID for a same spot for a same client but different T&B systems. A T&B system is a traffic and billing system (i.e. Eclipse or Novar). When the process is initiated within the advertising media management system 102, an advertising media content is being validated at 2602. The user interacts with the advertising media management system at 2604 through an application program interface to access a media library record created with a new spot ID at 2606. The new spot ID record is routed to the media approval queue at 2608 such that it can be claimed by a media tech at 2610. The media tech upon approval of the new spot ID record at 2612 will cause the new media to be routed for transcoding at step 2614. When initiated within the ad copy wizard 1702, a client is selected and added to a group at 2618. The library associated with the group is accessed at 2620, and a search for the spot name within the Traffic library made at 2622. If the spot is located at 2624 and it is determined that the spot is already associated at 2626, the spot may be associated at 2624 and associated with the new content at 2630. The newly associated spot may then be validated at 2632.

If the spot is not currently located within the traffic and billing library as determined at 2634, an indication to add the spot may be actuated at 2636 and the spot name is searched for within the advertising media management system library. If a percent match is not available as determined at 2640 the spot is added as non-associated at 2642 and a reserve spot ID issued at 2644. The spot may then be validated at 2646 if a percentage match is available as determined at 2648 the located spot is associated at 2650 and may be validated at 2652.

Figure 27:
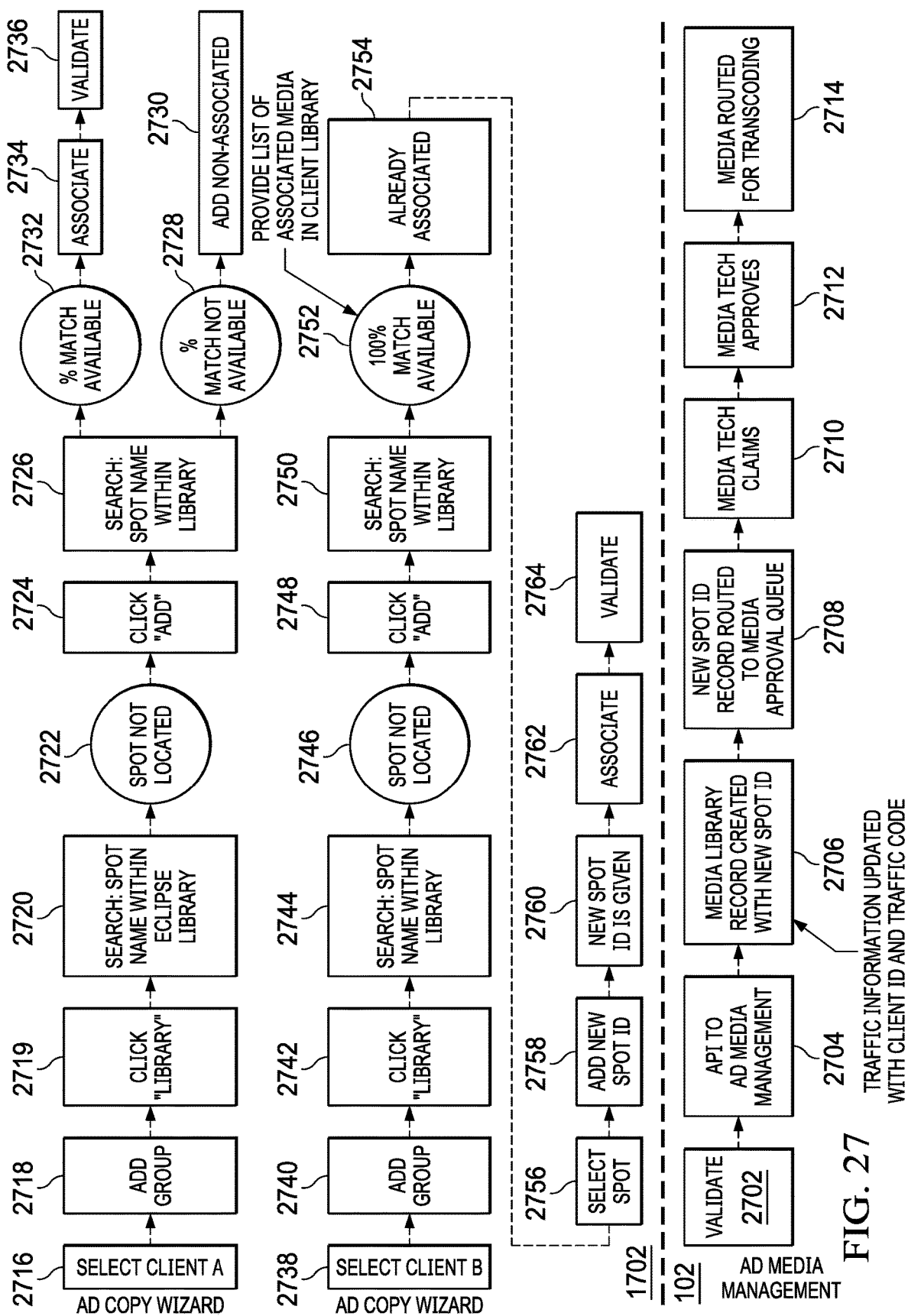
FIG. 27 illustrates the generation of a reserve spot ID for a same spot for different clients within a same T&B system.

Finally, referring now to FIG. 27, there is illustrated the generation of a reserve spot ID for a same spot for different clients within a same T&B system. When a spot is to be validated at 2702 within the advertising media management system 102, the spot is accessed via an API within the advertising media management system at 2704. The media library record is created with a new spot at 2706. The new spot ID record is routed to the media approval queue at 2708 wherein it may be claimed by a media tech at 2710 and approved by the media tech at 2712. The approved new media content may then be routed for transcoding at 2714. When the ad copy wizard 1702 selects a client at 2716. The client is added to a group at 2718 by clicking on a library at 2719 and searching for the spot name within the Traffic library at 2720. If the spot is not located at step 2722 an add feature is actuated at 2724 and the spot name may be search for within the advertising media management system library 2720 at 2726. If no percentage match is available at 2728, the non-associated spot is added at step 2730. If a percentage media match is available at 2732, the spot may be associated with the content at 2734 and validated at 2736.

When client B is selected at 2738 a group may be added at 2740 by clicking on an associated library 2742 and searching for the spot name within the traffic and billing library at 2744. When the spot is not located at 2746, the spot is added by actuating an ad function at 2748 and the spot name may be searched for within the advertising media management library at 2750. A 100% match available is detected at 2752 indicating that the advertising content is previously associated at 2754. The spot associated with the previously associated spot is selected at 2756 and an indication to add a new spot ID is actuated at 2758. The spot is given a new ID at step 2760 which is associated with the spot at 2762. The spot and new spot ID may then be validated at 2764.

Figure 28:
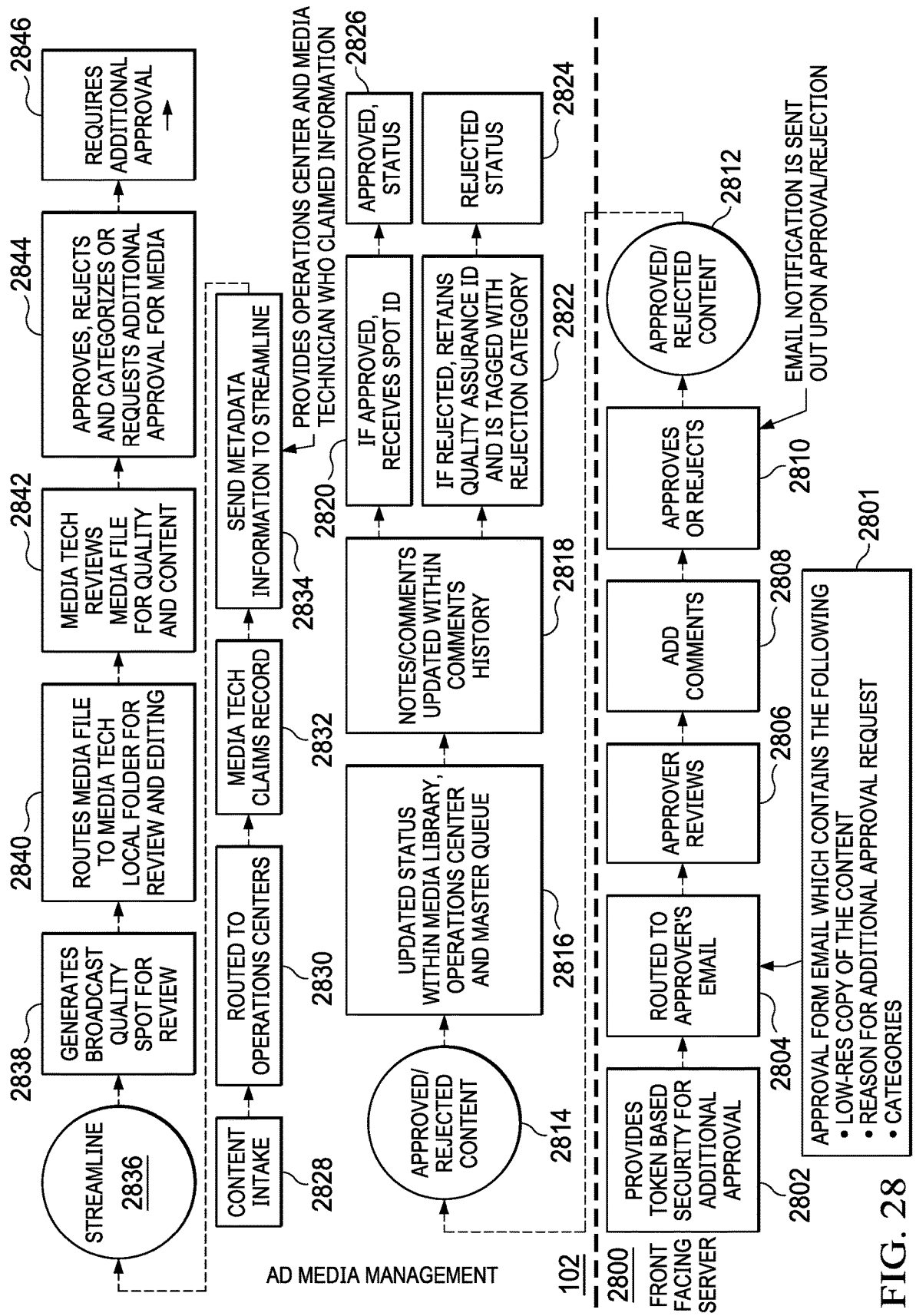
FIG. 28 illustrates additional approval workflow associated with advertising media spots that may occur between the advertising media management system and a front facing server.

Referring now to FIG. 28, there is illustrated additional approval workflow associated with advertising media spots that may occur between the advertising media management system 102 and a front facing server 2800. A front facing server 2000 enables external communications and approvals for questionable content. The front facing server 2800 provides token-based security for additional approval at 2802. An approval form email containing a low-res copy of content, reason for additional approval request and categories is routed to the approver's email address at 2804 from the approval request 2801. The approver will review the email at 2806 and add comments thereto at 2808. The approver will then approve or reject the request at 2810. The approved/rejected content 2812 is provided at 2814 to the advertising media management system 102 which may update the status of the advertising media content within the media library, ops center and master queue at 2816. The associated notes and comments associated with the media are updated 2818. If the process is rejected, the content retains the quality assurance ID and is tagged with a rejection category at 2822 such that it is in the rejected status 2824. If approved, the media content receives a spot ID at 2820 and approved status at 2820.

A content intake process 2828 within the online media management system 102 routes content to the operation center at 2830. The media tech will claim the record that has been routed to the operation center at 2832 and the online media management system will send metadata info to the backend at 2834. The backend 2836 will generate a broadcast quality spot for review at 2838. Media files are routed to the media techs local folder for review and editing at 2840. The media tech reviews the media file for quality of content at 2842 and either approves, rejects and categorizes or request additional information for the media content at 2844. The material will then be further provided for additional approval at 2846.

The above system describes a process for obtaining management and approval of actual advertising media content that is to be used for inclusion within purchased advertising slots provided by a cable or online content provider. This enables the content writer to assure that the provided advertising media content is appropriate and that the desired content is provided in its associated advertising slot.

It will be appreciated by those skilled in the art having the benefit of this disclosure that this advertising media management system provides an improved method for managing actual advertising media content that is to be displayed within the advertising slots of a cable or other type of online media content provider. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for managing advertising media by a cable network provider, comprising:
   a content provider interface for downloading advertising media from advertising media content providers;
   a database for storing the advertising media;
   a processor configured to implement an advertising media management system responsive to a stored set of instructions;
   a memory coupled to the processor, the memory having data and a set of instructions for implementing an advertising media management system, the data including the advertising inventory data, the set of instructions configuring the processor to provide:
   a management dashboard controller for controlling a presentation of a plurality of graphical reports relating to available advertising media within the database using a management dashboard controller;
   a required media controller for generating a list of received advertising media that have not been encoded;
   a queue controller for grouping the advertising media stored within the database to be processed by the advertising media management system according to a first queue of all advertising media to be processed and a plurality of second queues each comprising a portion of all of the advertising media of the first queue, wherein at least one advertising media is contained within multiple ones of the plurality of second queues;
   a media library controller for displaying all approved advertising media stored within the database and an associated status of the approved advertising media;
   an audit logs controller for tracking all users interaction with each of the advertising media stored within the database through the advertising media management system and for tracking all functional tasks preformed on each of the advertising media stored within the database; and
   an application administration controller for controlling of system application settings.

2. The system of claim 1, wherein the processor further provides a quality control (QC) process enabling tagging of the advertising media with content categories to enable automated restrictions for networks.

3. The system of claim 1, wherein the processor is further configured to implement an ad copy wizard for generating identifiers and editing advertising media processed by the advertising media management system.

4. The system of claim 1, wherein the ad copy wizard associates ad copy instructions with the advertising media using an ISCI and advertising media name.

5. The system of claim 1, wherein the management dashboard controller further enables a creation of virtual operating centers to manage content from various advertising media aggregators.

6. The system of claim 5, wherein the management dashboard tracks an operating center, media tech and traffic/sales person conducting quality assurance and ad copy association on the advertising media.

7. The system of claim 1, wherein the required media controller presents status data with respect to advertising orders that do not currently have one of the advertising media associated therewith.

8. The system of claim 1, wherein the media library controller determines and displays a status of the advertising media within the database responsive to status parameters associated with the advertising media.

9. The system of claim 1, wherein the required media controller enables the advertising media to be encoded responsive to predefine client established variances.

10. The system of claim 1, wherein the processor further provides a quality control (QC) process enabling tagging of the advertising media with content categories to enable automated restrictions for networks.

11. The system of claim 1, wherein the queue controller enables a media tech to claim one of the advertising media from the database that has previously been assigned to an operations center.

12. The system of claim 1, wherein the management dashboard controller displays a traffic instance, zone and network the advertising media has been assigned to by the advertising media management system.

13. A method for managing advertising media by a cable network provider, comprising:
   downloading advertising media from advertising media content providers through a content provider interface;
   storing the advertising media within a database;
   controlling a presentation of a plurality of graphical reports relating to available advertising media within the database using a management dashboard controller through a management dashboard controller of an advertising media management system;
   generating a list of received advertising media that have not been encoded with a required media controller of the advertising media management system;
   grouping the advertising media stored within the database to be processed by the advertising media management system according to a first queue of all advertising media to be processed and a plurality of second queues each comprising a portion of all of the advertising media of the first queue, wherein at least one advertising media is contained within multiple ones of the plurality of second queues a queue controller of the advertising media management system;
   displaying all approved advertising media stored within the database and an associated status of the approved advertising media a media library controller of the advertising media management system; tracking all users interaction with each of the advertising media stored within the database through the advertising media management system and for tracking all functional tasks preformed on each of the advertising media stored within the database an audit logs controller of the advertising media management system; and
   controlling of system application settings an application administration controller of the advertising media management system.

14. The method of claim 13 further comprising tagging the advertising media with content categories to enable automated restrictions for networks.

15. The method of claim 13 further comprising generating identifiers and editing advertising media processed by the advertising media management system.

16. The method of claim 13 further comprising associating ad copy instructions with the advertising media using an ISCI and advertising media name.

17. The method of claim 13 further comprising creating virtual operating centers to manage content from various advertising media aggregators.

18. The method of claim 17 further comprising tracking an operating center, media tech and traffic/sales person conducting quality assurance and ad copy association on the advertising media.

19. The method of claim 13 presenting status data with respect to advertising orders that do not currently have one of the advertising media associated therewith.

20. The method of claim 13 further comprising determining and displaying a status of the advertising media within the database responsive to status parameters associated with the advertising media.

21. The method of claim 13 further comprising encoding the advertising media responsive to predefine client established variances.

22. The method of claim 13 further comprising converting the advertising media in a first format to advertising media in a digital format using a trim process.

23. The method of claim 13 further comprising enabling a media tech to claim one of the advertising media from the database that has previously been assigned to an operations center.

24. The method of claim 13 further comprising displaying a traffic instance, zone and network the advertising media has been assigned to by the advertising media management system.

* * * * *